(12) United States Patent
Yokoyama et al.

(10) Patent No.: US 9,176,333 B2
(45) Date of Patent: Nov. 3, 2015

(54) LIGHT MODULATOR ELEMENT AND MICROSCOPE APPARATUS INCLUDING LIGHT MODULATION ELEMENT

(75) Inventors: Masafumi Yokoyama, Tokyo (JP); Nobuyuki Hashimoto, Saitama (JP); Makoto Kurihara, Saitama (JP); Kenji Matsumoto, Tokyo (JP); Ayano Tanabe, Tokyo (JP); Yuka Saito, Saitama (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 156 days.

(21) Appl. No.: 14/004,174

(22) PCT Filed: Mar. 9, 2012

(86) PCT No.: PCT/JP2012/056149
§ 371 (c)(1),
(2), (4) Date: Sep. 10, 2013

(87) PCT Pub. No.: WO2012/124634
PCT Pub. Date: Sep. 20, 2012

(65) Prior Publication Data
US 2013/0342768 A1    Dec. 26, 2013

(30) Foreign Application Priority Data

Mar. 11, 2011   (JP) ................................ 2011-054127

(51) Int. Cl.
| | | |
|---|---|---|
| *G02F 1/01* | (2006.01) | |
| *G02F 1/13* | (2006.01) | |
| *G02F 1/1335* | (2006.01) | |
| *G02F 1/1347* | (2006.01) | |
| G02B 21/00 | (2006.01) | |
| G02B 21/06 | (2006.01) | |
| G11B 7/1369 | (2012.01) | |
| G02F 1/1343 | (2006.01) | |

(52) U.S. Cl.
CPC .......... *G02F 1/0136* (2013.01); *G02B 21/0032* (2013.01); *G02B 21/0068* (2013.01); *G02F 1/1313* (2013.01); *G02F 1/13471* (2013.01); *G02F 1/133528* (2013.01); *G02B 21/0092* (2013.01); *G02B 21/06* (2013.01); *G02F 1/134309* (2013.01); *G11B 7/1369* (2013.01)

(58) Field of Classification Search
CPC ... G02F 1/13; G02F 1/1347; G02F 1/133528; G02F 1/0136; G02F 1/1313; G02F 1/133634; G02F 1/134309; G02F 2413/08; G02F 1/133602; G02F 1/1343; G02F 1/133308; H04N 9/3197; H04N 9/3167; H04N 9/3155; H04N 9/3141; H04N 5/7441; G02B 21/0032; G02B 21/0068; G02B 21/0092; G02B 27/1046; G02B 27/26; G02B 27/286; G02B 5/3016
USPC ............... 349/96, 5, 1, 101, 121, 193, 58, 74, 349/202, 139, 65; 353/20; 359/236, 487.03; 362/19
See application file for complete search history.

(56) References Cited

U.S. PATENT DOCUMENTS

| | | | |
|---|---|---|---|
| 6,476,966 B1 * | 11/2002 | Hernandez et al. ...... | 359/484.06 |
| 2004/0252258 A1 * | 12/2004 | Matsushima ................... | 349/96 |
| 2008/0192166 A1 | 8/2008 | Wang et al. | |
| 2009/0244411 A1 | 10/2009 | Tanane et al. | |
| 2009/0284835 A1 | 11/2009 | Meshulach et al. | |

FOREIGN PATENT DOCUMENTS

| | | |
|---|---|---|
| JP | 2001-013476 A | 1/2001 |
| JP | 2005-202323 A | 7/2005 |
| JP | 2007-025143 A | 2/2007 |
| JP | 2009-031698 A | 2/2009 |
| JP | 2009-229756 A | 10/2009 |
| JP | 2010-015877 A | 1/2010 |
| JP | 2010-019630 A | 1/2010 |
| JP | 2010-096947 A | 4/2010 |
| JP | 2010-134981 A | 6/2010 |

OTHER PUBLICATIONS

EPO, European Search Report for European Patent Application No. EP 12 75 8052, Aug. 22, 2014.

Stalder M et al., "Linearly polarized light with axial symmetry generated by liquid-crystal polarization converters", Optics Letters, Optical Society of America, Dec. 1, 1996, pp. 1948-1950, vol. 21, No. 23, XP002721209, ISSN: 0146-9592, DOI: 10.1364/01.21.00194, US.

International Search Report for International Application No. PCT/JP2012/056149, Jun. 5, 2012.

* cited by examiner

*Primary Examiner* — Thoi Duong

(57) ABSTRACT

A light modulator element includes a liquid crystal element which has a liquid crystal layer containing liquid crystal molecules aligned along a first direction, and two transparent electrodes disposed in opposition to each other with the liquid crystal layer sandwiched therebetween, and which controls the phase of linear polarization light and passing through said liquid crystal layer by applying an electric voltage between said two transparent electrodes; a polarizer plate which is disposed between a light source and said liquid crystal element and which has the transmission axis along the first direction or along a direction orthogonal to said first direction; and a rotation mechanism which supports the liquid crystal element and the polarizer plate and which rotates the liquid crystal element and the polarizer plate integrally in one unit with the optical axis of the liquid crystal element as the rotation axis.

12 Claims, 15 Drawing Sheets

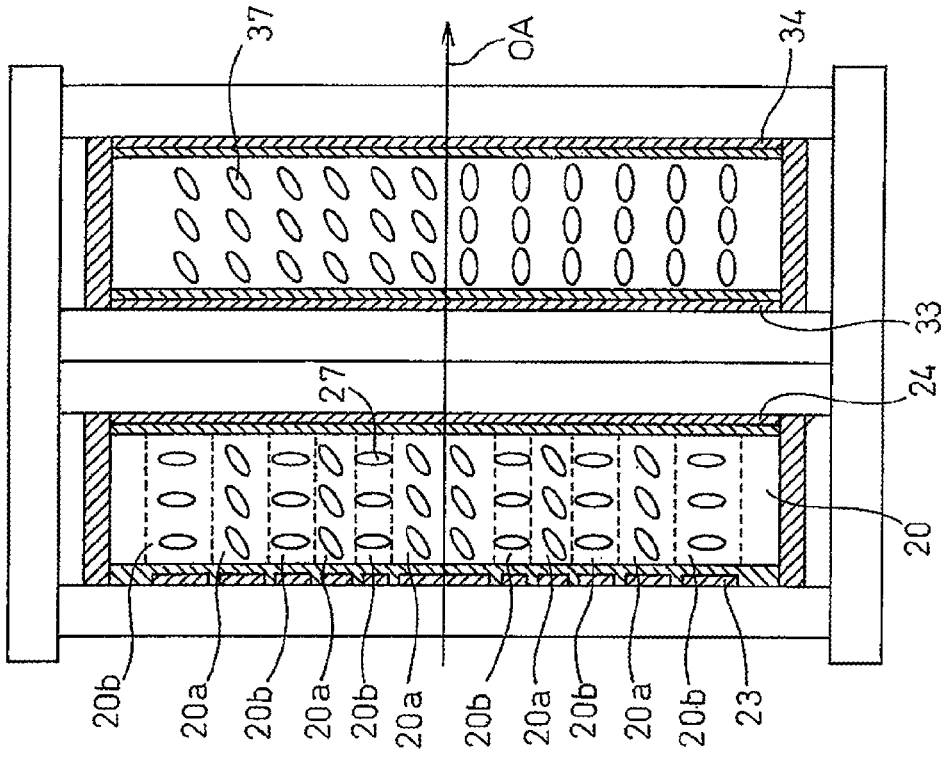
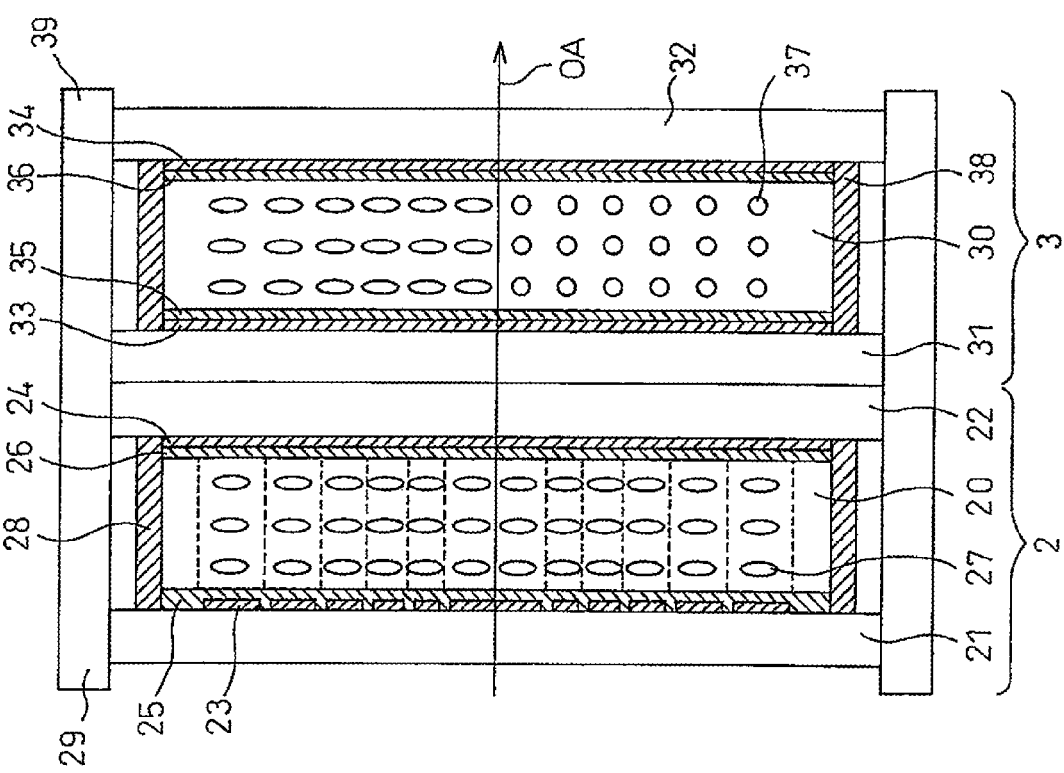

LIGHT MODULATOR ELEMENT AND MICROSCOPE APPARATUS INCLUDING LIGHT MODULATION ELEMENT

FIELD

The present invention relates to a light modulator element that uses liquid crystal to control the phase of light passing through the liquid crystal, and to a microscope apparatus including such a light modulator element.

BACKGROUND

An apparatus that irradiates an object with light to detect information such as the shape of the object, or to induce change in the object has been used conventionally, such as, for example, a laser microscope, an optical pickup device, a laser processing machine, etc. In such an apparatus, in order to achieve higher resolution, it is desirable that the diameter of the beam spot irradiated from a light source and focused onto an object be as small as possible. In general, the minimum size of the beam spot is determined by the diffraction limit, and is proportional to the wavelength of light. Thus, the shorter the wavelength of light irradiated from a light source, the smaller is the diameter of the beam spot.

However, a light source that emits light of shorter wavelength, for example, a laser that emits violet or ultra-violet light is generally higher in price than a light source that emits light of longer wavelength, for example, green or red light. Also, in the wavelength from violet to ultra-violet range, light transmittance of an optical material becomes generally lower as wavelength become shorter. Thus, availability of optical material having high light transmittance for violet or ultra-violet is very limited.

In this respect, radial polarization has been attracting increasing attention. Radial polarization is a polarization state in which direction of a polarization plane of linear polarization light is distributed symmetrically in a radial direction with the optical axis as the center. It is reported that, by focusing radial polarization with an objective lens, a light beam focused on the focal plane becomes z-polarized light (i.e., polarized light in which direction of electric field is same as the direction of propagation of light), and the light beam can be focused with a spot size smaller than the spot size of X- or Y-polarized light determined by the diffraction limit, and thus, it is possible to achieve a super resolution effect. A microscope apparatus which incorporates a light modulator element for converting linear polarization light from a light source to radial polarization light has been proposed (see, for example, Japanese Unexamined Patent Publication No. 2010-19630 and Japanese Unexamined Patent Publication No. 2010-15877).

A method has been proposed for correcting wave front aberration by disposing a liquid crystal light modulator element in an optical system to impart phase distribution to the light beam passing through the light modulator element so as to cancel wave front aberration produced in the optical system (see, for example, Japanese Unexamined Patent Publication No. 2005-202323).

SUMMARY

A light modulator element may be designed such that, when a linear polarization light having the polarization plane along a prescribed direction perpendicular to the incidence plane is incident on the light modulator element, it can convert the linear polarization light to radial polarization light. In order to obtain the super-resolution effect as described above, it is required, when the light modulator element is incorporated in the light irradiation apparatus, that the alignment of the light modulator element is adjusted so as to set the polarization plane of the linear polarization light emitted from a light source to a prescribed direction on the incidence plane of the light modulator element.

In the case where wave front aberration produced in an optical system is corrected with a light modulator element using liquid crystal, if the polarization plane of the incident linear polarization light is not in a prescribed direction relative to the alignment direction of the liquid crystal molecules contained in the light modulator element, the phase distribution imparted to the light flux passing through the light modulator element deviates from the phase distribution as designed, and proper correction of the wave front aberration cannot be achieved. Thus, in this case too, accurate alignment of the light modulator element is required such that the polarization plane of the incident linear polarization light is in the prescribed direction relative to the alignment direction of the liquid crystal molecules contained in the light modulator element.

Therefore, it is an object of the present invention to provide a light modulator element in which the alignment direction of the liquid crystal molecules can be aligned to a prescribed direction of the polarization plane of the incident linear polarization light.

In accordance with the present invention, a light modulator element is provided. This light modulator element includes a first liquid crystal element which has a first liquid crystal layer containing liquid crystal molecules aligned along a first direction and two first transparent electrodes disposed so as to be opposed to each other with the first liquid crystal layer sandwiched therebetween, wherein phase of linear polarization light of a prescribed wavelength emitted from a light source and passing through the first liquid crystal layer is controlled by applying an electric voltage in accordance with the prescribed wavelength between two transparent electrodes, a polarizer plate that is disposed between the light source and the first liquid crystal element and has transmission axis along the first direction or along a direction orthogonal to the first direction, and a rotation mechanism which supports the first liquid crystal element and the polarizer plate and rotates the first liquid crystal element and the polarizer plate as one unit about the optical axis of the first liquid crystal element as a rotation axis.

In the light modulator element, the polarizer plate is preferably supported removably to the rotation mechanism.

In addition, in the light modulator element, the rotation mechanism preferably has a guide rail between the light source and the first liquid crystal element so as to support the polarizer plate movably along a plane perpendicular to the optical axis in the range from a first position in which the polarizer plate does not interrupt the light flux of the linear polarization light incident on the first liquid crystal element to a second position in which the entire light flux passes through the polarizer plate.

Further, in the light modulator element, it is preferable that one of two first transparent electrodes of the first liquid crystal element is the annular electrode corresponding to at least one of first annular zone among a plurality of concentric annular zones with the optical axis as a center, and that the first liquid crystal element reverses the phase of the linear polarization light passing through the first annular zone relative to the phase of the linear polarization light passing through the second annular zone different from the first annular zone among the plurality of annular zones by applying an electric voltage in accordance with the prescribed wavelength between the annular electrode and the other of two first transparent electrodes.

In addition, preferably, the light modulator element further includes a polarization plane rotation element that converts linear polarization light exiting from the first liquid crystal element to a radial polarization light. In this case, preferably, the rotation mechanism supports the first liquid crystal element, the polarization plane rotation element and the polarizer plate, and rotates the first liquid crystal element, the polarization plane rotation element and the polarizer plate as one unit with the optical axis as the rotation axis.

Preferably, the light modulator element further includes, in a microscope apparatus having a light source and an objective lens, an attachment unit for attaching the light modulator element between the light source and the objective lens such that the light modulator element converts the linear polarization light emitted from the light source to radial polarization light and the radial polarization light is focused onto an object by the objective lens.

In this case, preferably, the polarization plane rotation element includes a second liquid crystal layer containing liquid crystal molecules, and two second transparent electrodes disposed so as to be opposed to each other with the second liquid crystal layer sandwiched therebetween, and the second liquid crystal layer has a plurality of regions arranged along the circumferential direction with the optical axis as a center, alignment direction of liquid crystal molecules contained in each of the plurality of regions being different from each other, and each of the plurality of regions of the second liquid crystal layer rotates, by applying an electric voltage in accordance with the prescribed wavelength between the two second transparent electrodes, the polarization plane of the component of the linear polarization light passing through the region so as to be parallel to radial direction with the optical axis as the center in accordance with the alignment direction of the liquid crystal molecules contained in the region.

Preferably, in the light modulator element, one of the two first transparent electrodes of the first liquid crystal element is a plurality of annular electrodes disposed correspondingly to each of the plurality of concentric annular zones with the optical axis as the center, and the first liquid crystal element controls, for each of the plurality of annular electrodes, by adjusting the electric voltage applied between the annular electrode and the other of the two first transparent electrodes, the amount of phase modulation of the linear polarization light passing through each of the plurality of annular zones.

Further, preferably, the light modulator element is disposed in an optical system having a light source and an objective lens, and the light modulator element comprises a drive device for adjusting, for each of the plurality of annular electrodes, the electric voltage applied between the annular electrode and the other of the two first transparent electrodes such that it produced an amount of phase modulation in the linear polarization light passing through each of the plurality of annular zones so as to cancel the phase distribution of wave front aberration produced in the optical system.

Also, preferably, the light modulator element further comprises a second liquid crystal element which is disposed between the polarizer plate and the first liquid crystal element along the optical axis, and has a second liquid crystal layer containing liquid crystal molecules aligned along a first direction and two second transparent electrodes disposed so as to be opposed to each other with the second liquid crystal layer sandwiched therebetween, and which controls the phase of the linear polarization light passing through the second liquid crystal layer by applying an electric voltage in accordance with the prescribed wavelength between the two second transparent electrodes. In this case, preferably, the rotation mechanism supports the first liquid crystal element, the second liquid crystal element and the polarizer plate, and rotates the first liquid crystal element, the second liquid crystal element and the polarizer plate as one unit.

In the light modulator element, preferably, the electrode pattern of at least one of the two second transparent electrodes is different from either of the electrode patterns of the two first transparent electrodes.

In accordance with another aspect of the present invention, a microscope apparatus is provided. The microscope apparatus includes a light source which emits linear polarization light of prescribed wavelength, a light modulator element which controls the phase of the linear polarization light, an objective lens which focuses the light flux passing through the light modulator element onto a prescribed spot of a specimen, and a light receiving element which receives light from the prescribed spot. The light modulator element includes a liquid crystal element having a first liquid crystal layer containing liquid crystal molecules aligned along a first direction, and two first transparent electrodes disposed so as to be opposed to each other with the first liquid crystal layer sandwiched therebetween, wherein the phase of linear polarization light passing through the first liquid crystal layer is controlled by applying an electric voltage between the two transparent electrodes in accordance with the prescribed wavelength, a polarizer plate that is disposed between the light source and the liquid crystal element and has transmission axis along the first direction or along a direction orthogonal to the first direction, and a rotation mechanism which supports the liquid crystal element and the polarizer plate and rotates the first liquid crystal element and the polarizer plate as one unit about the optical axis of the liquid crystal element as a rotation axis.

Effect of the Invention

The light modulator element according to the present invention has an effect that the polarization plane of the incident linear polarization light can be brought into coincidence with the alignment direction of the liquid crystal molecules.

BRIEF DESCRIPTION OF DRAWINGS

FIG. 5A is a schematic side sectional view showing the light modulator element with no electric voltage applied as seen from the direction of the arrow YY' at the dotted line of FIG. 4, and FIG. 5B is a schematic side sectional view showing the light modulator element with an electric voltage applied as seen from the direction of the arrow YY' at the dotted line of FIG. 4.

DESCRIPTION OF EMBODIMENTS

The light modulator element according to various embodiments will be described below with reference to drawings.

The light modulator element has a liquid crystal element for controlling the phase or the polarization plane of incident linear polarization light. The light modulator element further has a rotation mechanism for rotating the liquid crystal element relative to the polarization plane of the linear polarization light, and by detecting the deviation of the actual direction of polarization plane of the linear polarization light relative to the alignment direction of the liquid crystal molecules of the liquid crystal element from the intensity of light passing through the liquid crystal element, it is possible to bring the direction of the polarization plane of the linear polarization light emitted from the light source and the alignment direction of the liquid crystal molecules into coincidence.

Figure 1:
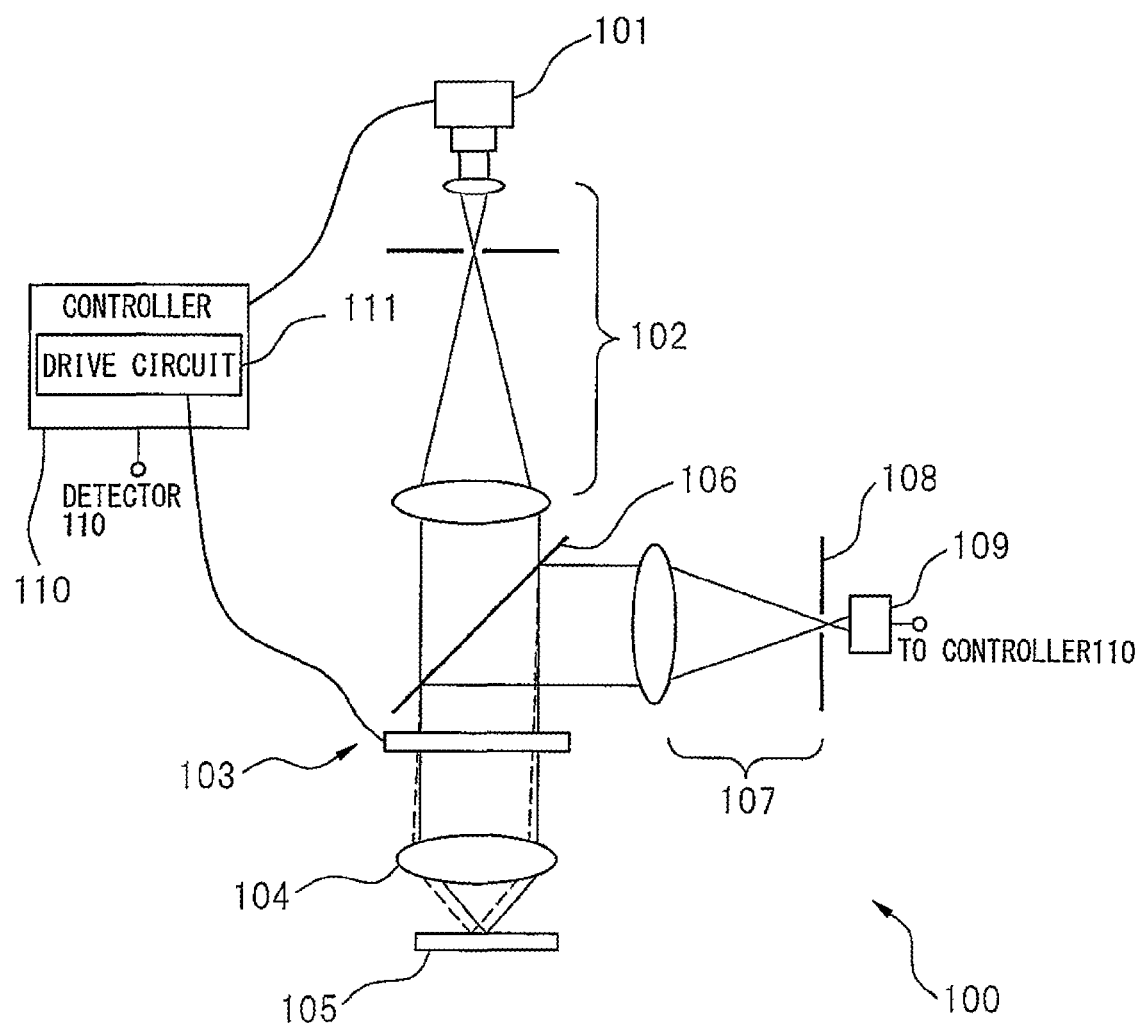
FIG. 1 is a schematic view showing the construction of a laser microscope including a light modulator element according to an embodiment of the present invention.

FIG. 1 is a schematic view showing the construction of a laser microscope including the light modulator element according to an embodiment of the present invention. In the laser microscope 100, the light flux exiting from the laser light source 101 that is a coherent light source emitting linear polarization light is collimated by a collimating optical system 102 into parallel light beam to pass through a beam splitter 106. The parallel light beam passes through the light modulator element 103, and is focused by an objective lens 104 onto a specimen 105. Light flux containing information regarding the specimen 105, such as light flux reflected or scattered from the specimen 105 or fluorescence generated by the specimen, returns in the optical path and is reflected by the beam splitter 106 to be focused by a confocal optical system 107 onto a confocal pin hole 108. Light flux other than the light flux from the focal point of the specimen is cut-off from the total light flux, and only the light flux from the focal point of the specimen is detected by a detector 109 having a photodiode or a photomultiplier tube. The detector 109 outputs an electric signal corresponding to the detected light intensity to a controller 110.

The controller 110 has, for example, a processor, a memory and an interface circuit for connecting the controller 110 to various parts of the laser microscope 100. The controller 110 controls the laser light source 101 and the light modulator element 103. The controller 110 supplies prescribed electric power to the laser light source 101 to cause the laser light source 101 to emit irradiation light. When the laser light source 101 has plural light emitting elements, the controller 110 sends in accordance with user's operation via an interface (not illustrated), a control signal to the laser light source 101 to cause one of the plural light emitting elements to output irradiation light.

Further, the controller 110 has a drive circuit 111 and controls the light modulator element 103 via the drive circuit 111. Thus, the controller 110 controls the drive circuit 111 such that an electric voltage in accordance with the wavelength of light emitted from the laser light source 101 is applied to each liquid crystal layer of the light modulator element 103. The light modulator element 103 can thereby control the phase and the polarization plane of the linear polarization light having the prescribed wavelength.

In particular, when the laser light source 101 has plural light emitting elements each outputting light of different wavelength, the controller 110 adjusts the electric voltage applied to the liquid crystal layer of the light modulator element 103 in accordance with the light emitting element to be caused to emit light.

The drive electric voltage applied by the drive circuit 111 to the liquid crystal layer of the light modulator element 103 may be, for example, pulse height modulated (PHM) or pulse width modulated (PWM) alternating electric voltage.

In order to improve the resolution in the direction parallel to the surface of the specimen 105, it is preferable that the spot size of the light flux focused on the specimen 105 is as small as possible. On the other hand, by converting the light flux focused onto the specimen 105 to Z-polarized light, the light flux can be focused onto the specimen 105 in spot size smaller than a spot size determined by diffraction limit and in longer focal depth. By converting the light flux passing through the objective lens 104 to Z-polarized light, it is possible to obtain light flux on the specimen 105 in Z-polarization.

Figure 2A:
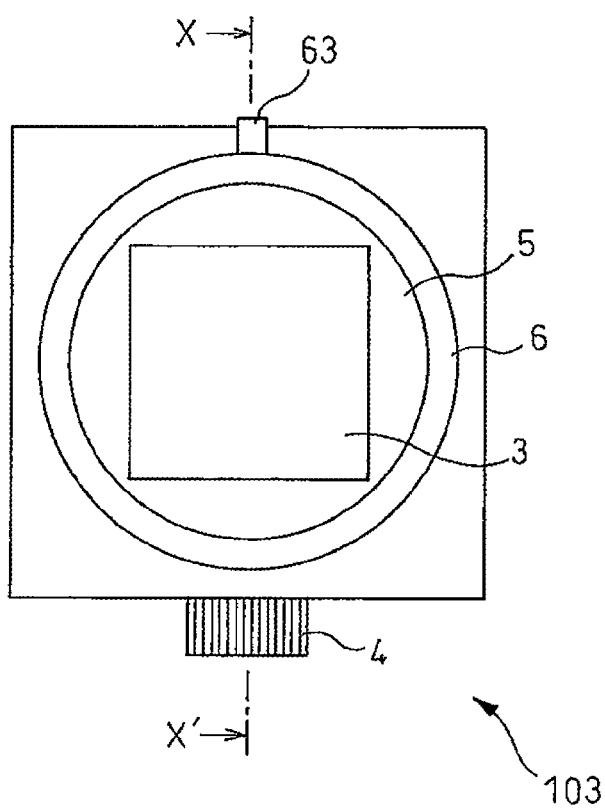
FIG. 2A is a schematic rear view showing a light modulator element according to a first embodiment of the present invention as seen from the side of the polarization plane rotation element.
Figure 2B:
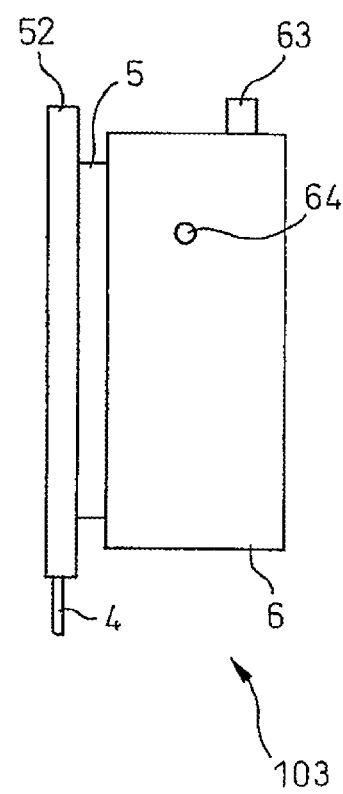
FIG. 2B is a schematic side view showing the light modulator element according to the first embodiment.
Figure 3A:
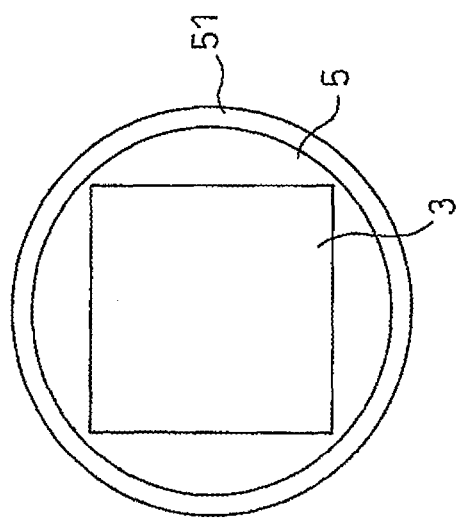
FIG. 3A is a schematic rear view showing a rotation support member of the light modulator element.
Figure 3B:
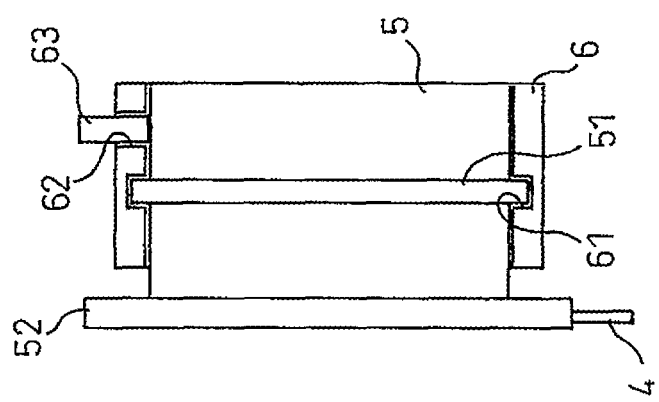
FIG. 3B is a perspective side view showing the light modulator element.
Figure 3C:
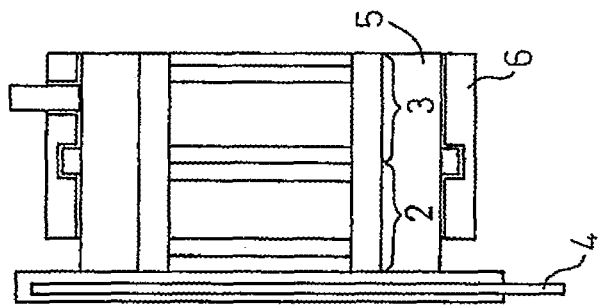
FIG. 3C is a schematic side sectional view showing the light modulator element as seen from the direction of the arrow XX' at the dotted line of FIG. 2A.

FIG. 2A is a schematic rear view showing a light modulator element according to a first embodiment of the present invention as seen from the objective lens side. FIG. 2B is a schematic side view showing the light modulator element. FIG. 3A is a schematic rear view showing a rotation support member of the light modulator element, FIG. 3B is a perspective side view of the light modulator element, and FIG. 3C is a schematic side sectional view of the light modulator element taken along the dotted line as seen from the direction of an arrow XX' in FIG. 2A. The light modulator element 103 includes a phase reversal element 2, a polarization plane rotation element 3, a polarizer plate 4, a rotation support member 5 and a casing 6. Of these elements, the phase reversal element 2 and the polarization plane rotation element 3 are liquid crystal elements.

The light modulator element 103 is disposed such that linear polarization light is incident from the side of the phase reversal element 2, and the linear polarization light passes through the phase reversal element 2 and the polarization plane rotation element 3, in this order. Therefore, in the laser microscope 100 shown in FIG. 1, the light modulator element 103 is disposed such that the phase reversal element 2 is positioned on the side of the light source 101 and the polarization plane rotation element 3 is positioned on the side of the objective lens 104.

When linear polarization light is incident from the side of the phase reversal element 2 (the left side in FIG. 3C), the light modulator element 103 converts the linear polarization to radial polarization. The light modulator element 103 causes the radial polarization light to exit from the side of the polarization plane rotation element 3 (the right side in FIG. 3C). The polarizer plate 4 is disposed nearer to the incident light than the phase reversal element 2, and is used to confirm the deviation of incident direction of polarization plane predetermined for the light modulation element 103 relative to the polarization plane of linear polarization light incident on the light modulator 103.

The phase reversal element 2, the polarization plane rotation element 3 and the polarizer plate will be described in detail later.

The rotation support member 5 and the casing 6 are examples of the rotation mechanism that enables the phase reversal element 2, the polarization plane rotation element 3 and the polarizer plate 4 to be rotated in one unit with the optical axis of respective elements as rotation axis.

The rotation support member 5 is formed from metal or resin material, for example, and has substantially cylindrical shape. The rotation support member 5 holds the phase reversal element 2 and the polarization plane rotation element 3 therein. The phase reversal element 2 and the polarization plane rotation element 3 are held in the rotation support member 5 with the optical axis of the phase reversal element 2 and the optical axis of the polarization plane rotation element 3 in coincidence with each other and substantially in coincidence with the center line of the rotation support member 5. The common optical axis of the phase reversal element 2 and the polarization plane rotation element 3 will be referred to hereinafter as an optical axis OA. The phase reversal element 2 and the polarization plane rotation element 3 are fixed, for example, by bonding the outer circumferences of the phase reversal element 2 and the polarization plane rotation element 3 to the inner wall of the rotation support member 5 by using an adhesive. Alternatively, the phase reversal element 2 and the polarization plane rotation element 3 may be fixed to the rotation support member 5 by other method, for example, by using fastening means such as screws.

A flange 51 is formed on the outer circumference of the rotation support member 5 substantially in parallel to a plane perpendicular the optical axis OA in order to engage the rotation support member 5 with the casing 6. A guide rail 52 for holding the polarizer plate 4 is provided at the end of the rotation support member 5 on the side of the phase reversal element 2.

The casing 6 is formed from metal or resin material, for example, and is a cylindrical member having inner diameter substantially same as the outer diameter of the rotation support member 5. The rotation support member 5 is inserted into the casing 6. On the inner circumference of the casing 6, a groove 61 is formed along a plane perpendicular to the optical axis OA, and has width in the direction of the optical axis OA that is larger than the width of the flange 51. This groove 61 engages with the flange 51 of the rotation support member 5, whereby the casing 6 rotatably supports the rotation support member 5 with the optical axis OA as rotation axis. In order to permit the rotation support member 5 to be disposed in the casing 6, the casing 6 may be composed, for example, of two members split along the longitudinal direction of the cylinder. The two members can be disposed so as to sandwich the rotation support member 5 between them, and the joint surface of the two members can be fixed with an adhesive, for example. Alternatively, the two members composing the casing 6 can be fastened to each other using various other known means.

Further, a through-hole 62 is formed in the side wall of the casing 6, and a fastening member 63 is inserted into the through-hole 62. Thread grooves (not shown) are formed on the outer circumferential surface of the fastening member 63 and on the inner circumferential surface of the through-hole 62, respectively, so that the fastening member 63 can be screwed into the through-hole 62. When the fastening member 63 is rotated, for example, in clockwise direction, the fastening member is moved inward toward the interior of the casing 6 so that the end of the fastening member 63 presses against the rotation support member 5. The rotation support member 5 can be thereby fastened. On the other hand, when the fastening member 63 is rotated, for example, in anti-clockwise direction, the fastening member is moved outward toward the outside of the casing 6 so that the end of the fastening member 63 is separated from the rotation support member 5. When the end of the fastening member 63 is detached from the rotation support member 5, the rotation support member 5 is free to be rotated with the optical axis OA as rotation axis.

The casing 6 has an attachment unit for attaching the light modulator element 103 to the laser microscope 100. As such an attachment unit, the casing 6 has a screw hole 64 on the outer circumferential surface of the casing 6. Alternatively, the casing 6 may have other mechanism or structure as the attachment unit for attaching to an attachment mechanism of the light modulator element of the light irradiation apparatus.

Further, a hole may be formed on the side of the casing 6 for wiring in order to apply an electric voltage to the electrodes of the phase reversal element 2 and the polarization plane rotation element 3.

The phase reversal element 2 and the polarization plane rotation element 3 will be described in detail.

The phase reversal element 2 reverses the phase of the incident linear polarization light in at least one annular portion with the optical axis OA as the center relative to the phase of the remaining portion. The polarization plane rotation element 3 converts the light exiting from the phase reversal element 2 to radial polarization light. In the present embodiment, the phase reversal element 2 and the polarization plane rotation element 3 are constructed as liquid crystal elements, respectively.

Figure 4:
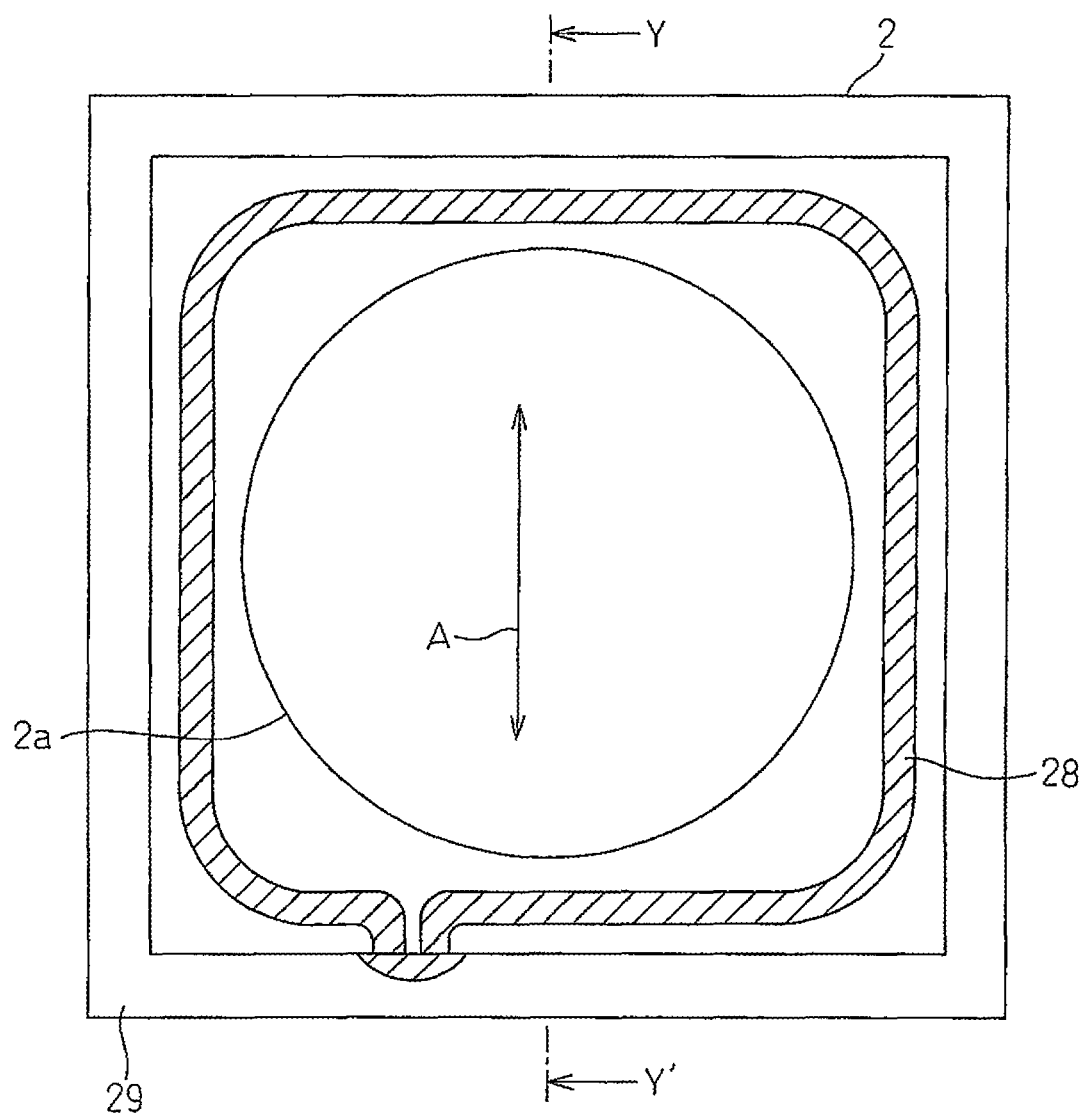
FIG. 4 is a schematic front view showing the light modulator element.

FIG. 4 is a schematic front view showing the phase reversal element 2 as seen from the side of the incident linear polarization light. FIG. 5A and FIG. 5B are schematic side sectional views showing the phase reversal element 2 and the polarization plane rotation element 3, respectively, along the dotted line as seen from the direction of the arrow YY' in FIG. 4. FIG. 5A represents the state of liquid crystal molecules contained in the phase reversal element 2 and the polarization plane rotation element 3 when electric voltage is not applied to the phase reversal element 2 and the polarization plane rotation element 3. FIG. 5B represents the state of liquid crystal molecules contained in the phase reversal element 2 and the polarization plane rotation element 3 when electric voltage is applied to the phase reversal element 2 and the polarization plane rotation element 3.

For the sake of clarity of explanation, in a state where the phase reversal element 2 and the polarization plane rotation element 3 are optimally oriented relative to the polarization plane of the linear polarization light, it is assumed that the polarization plane of the linear polarization light incident on the phase reversal element 2 is, as shown by the arrow A in FIG. 4, in a plane orthogonal to the plane of FIG. 4 and in vertical direction.

The phase reversal element 2 reverses the phase of the incident linear polarization light contained in the region 2a shown in FIG. 4 in at least one annular portion with the optical axis as the center relative to the phase of the remaining portion. For this purpose, the phase reversal element 2 has a liquid crystal layer 20, and transparent substrates 21, 22 disposed substantially in parallel on both sides of the liquid crystal layer 20 along the optical axis OA. Liquid crystal molecules 27 contained in the liquid crystal layer 20 are encapsulated between the transparent substrates 21, 22 and a sealing member 28. The phase reversal element 2 has a transparent electrode 23 disposed between the transparent substrate 21 and the liquid crystal layer 20, and a transparent electrode 24 disposed between the liquid crystal layer 20 and transparent substrate 22. The transparent substrates 21, 22 are formed from a material, for example, such as glass or resin, that is transparent to light having wavelength contained in a prescribed wavelength range. The transparent electrodes 23, 24 are formed, for example, from a material known as ITO that is indium oxide added with tin oxide. An alignment film 25 is disposed between the transparent electrode 23 and the liquid crystal layer 20. An alignment film 26 is disposed between the transparent electrode 24 and the liquid crystal layer 20. These alignment films align the liquid crystal molecules 27 in a prescribed direction. The alignment film 25, 26 may be omitted in the case where the liquid crystal molecules are aligned by methods not using an alignment film such as in structural alignment in which a structure is formed on the substrate side to align the liquid crystal molecules 27.

Further, a frame 29 is disposed on the outer circumference of each substrate, each transparent electrode and each alignment film, and the frame 29 holds each substrate.

As shown in FIG. 5A, the liquid crystal molecules 27 encapsulated in the liquid crystal layer 20 are aligned, for example, in homogeneous alignment and in substantially in parallel to the polarization plane of the incident linear polarization light. In other words, the liquid crystal molecules are aligned so that the long axis of liquid crystal molecules 27 is substantially parallel to the arrow A shown in FIG. 4.

Figure 6A:
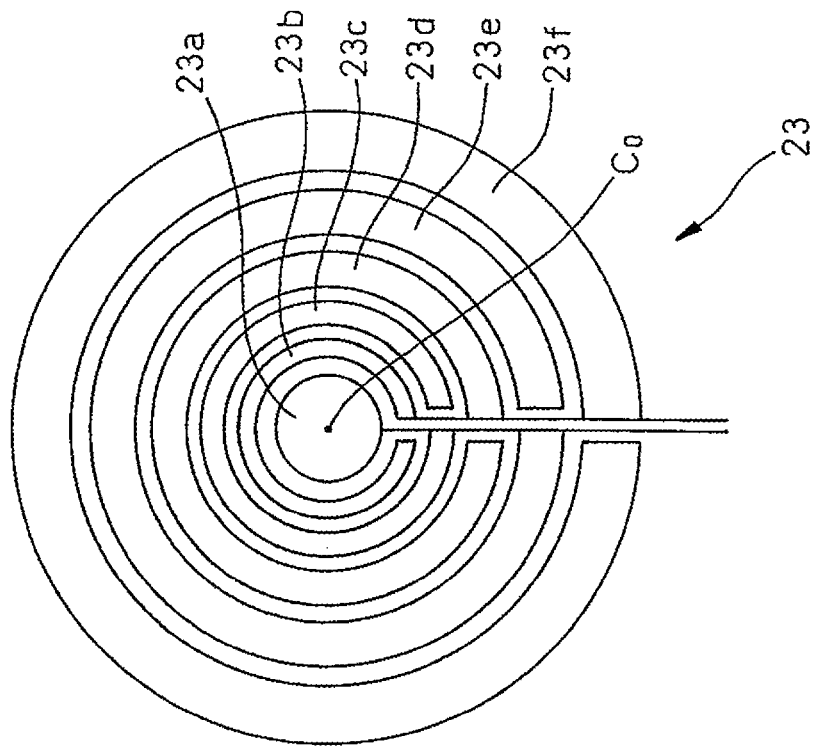
FIG. 6A is a schematic front view showing an example of a transparent electrode of a phase reversal element.
Figure 6B:
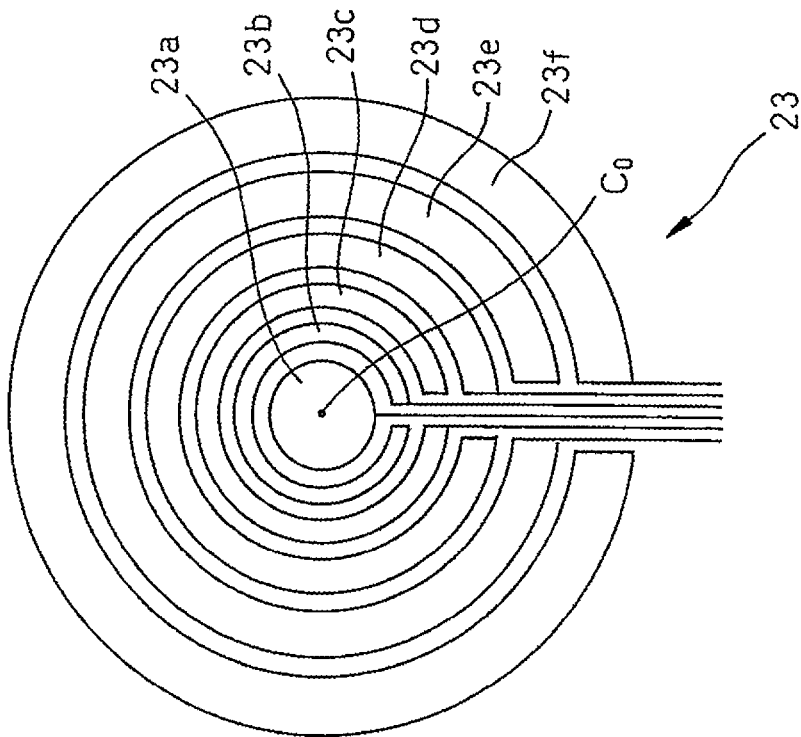
FIG. 6B is a schematic front view showing another example of the transparent electrode of the phase reversal element.

FIG. 6A is a schematic front view showing an example of the transparent electrode 23 provided on the phase reversal element 2 disposed on the side of incident light, FIG. 6B is a schematic front view showing another example of the transparent electrode 23. On the other hand, the transparent electrode 24 is formed so as to cover the entire liquid crystal layer 20. The transparent electrode 24 may also have a shape similar to the shape of the transparent electrode 23 shown in FIG. 6A or 6B, or the transparent electrode 24 may have the electrode shape as shown in FIG. 6A or FIG. 6B while the transparent electrode 23 may be formed so as to cover the entire liquid crystal layer 20.

The transparent electrode 23 has at least one concentric annular electrode with the intersection point $c_0$ of the optical axis OA and the phase reversal element 2 as the center. In the present embodiment, the transparent electrode 23 has a circular electrode 23a and at least one concentric annular electrode. In this example, the transparent electrode 23 has five annular electrodes 23b to 23f around the circular electrode 23a. Outer circumference of the annular electrode 23f corresponds to the outer circumference of the region 2a as shown in FIG. 4.

In the example shown in FIG. 6A, in order to be able to control each annular electrode independently, wiring is extracted from each annular electrode, and is connected to the drive circuit 111. In the example shown in FIG. 6B, by numbering in the order starting from the circular electrode 23a, even-numbered annular electrodes are electrically connected collectively to one same wire, and odd-numbered annular electrodes are electrically connected collectively to another wire, and the wire connecting the even-numbered annular electrodes and another wire connecting the odd-numbered annular electrodes are respectively connected to the drive circuit 111. With this configuration, the even-numbered annular electrodes can be driven at one electric potential, and similarly the odd-numbered annular electrodes can be driven at another electric potential. In FIG. 6B, either one of the group of even-numbered annular electrodes and the group of odd-numbered annular electrodes may be electrically uncontrolled. In this case, by applying an electric voltage between the other group of electrodes and the transparent electrode 24, phase of light can be reversed by the liquid crystal layer sandwiched between the other group of electrodes and the transparent electrode 24. Since the annular electrode has a certain thickness, the phase of light passing the annular electrode is shifted relative to the phase of light not passing the annular electrode. Therefore, as shown in FIG. 6A and FIG. 6B, not only the annular electrodes utilized for voltage control but also the annular electrodes not needed for voltage control are disposed so that, when electric voltage is not applied to the liquid crystal layer 20, the phase reversal element 2 can transmit light such that nearly all the light flux passing through the phase reversal element 2 has the same phase.

Further, it is preferable that the electric potential of the even-numbered annular electrode group or odd-numbered annular electrode group that needs not be electrically controlled be set to the same reference electric potential as the transparent electrode 24 provided on the transparent substrate on the side opposed to the annular electrode group or to a threshold potential, i.e., the maximum potential at which the liquid crystal molecules in the liquid crystal layer 20 are not operated. The threshold potential is generally about 1 to 2V in terms of effective voltage. By setting the electric potential of the annular electrode group not required to be electrically controlled in this manner, the electric potential of the liquid crystal layer 20 of the phase reversal element 2 can be controlled to be constant so that malfunction of the liquid crystal of the liquid crystal layer 20 due to noise such as electrostatic charge, etc., can be avoided. Thermal fluctuation of the liquid crystal layer 20 can also be suppressed by maintaining the annular electrode group not required to be electrically controlled at the threshold electric potential.

As shown in FIG. 6B, when an electric voltage is applied by the drive circuit 111 between the center circular electrode 23a along with the even-numbered annular electrodes 23c, 23e numbered from the center and the transparent electrode 24 disposed in opposition to each other with the liquid crystal layer 20 sandwiched therebetween, liquid crystal molecules tilt such that the long axis of liquid crystal molecules contained in a first annular portion 20a corresponding to the inter-electrode region having voltage applied thereon approaches from a direction perpendicular to the optical axis OA to a direction parallel to the optical axis OA. On the other hand, if no electric voltage is applied between the odd-numbered annular electrodes 23b, 23d, 23f and the transparent electrode 24, the liquid crystal molecules contained in a second annular portion 20b sandwiched between these electrodes are left intact with the long axis of the liquid crystal molecules remaining in the direction perpendicular to the optical axis OA.

In general, the refractive index $n_e$ for polarization component parallel to the long axis of liquid crystal molecules (i.e., for extraordinary ray) is higher than the refractive index $n_o$ for polarization component parallel to the short axis of liquid crystal molecules (i.e., for ordinary ray). Let $\psi$ be an angle formed between the direction of the long axis of the liquid crystal molecules contained in the first annular portion 20a when an electric voltage is applied between the transparent electrodes 23 and 24 and the direction of applied voltage, i.e., the direction of the optical axis OA, then the light passing through the liquid crystal layer 20 makes the angle $\psi$ relative to the direction of the long axis of liquid crystal molecules 27. Let $n_\psi$ be the refractive index of the liquid crystal molecules for polarization component parallel to the alignment direction of the liquid crystal molecules 27, then $n_o \leq n_\psi \leq n_e$. Therefore, when the liquid crystal molecules 27 contained in the liquid crystal layer 20 are aligned in homogeneous alignment and thickness of the liquid crystal layer 20 is d, an optical path difference $\Delta nd$ ($= n_\psi d - n_o d$) is produced between the polarization component passing through the first annular portion 20a and the polarization component passing through the second annular portion 20b. The phase difference $\Delta$ produced between these two polarization component is $2\pi\Delta nd/\lambda$. Here, $\lambda$ is wavelength of light incident on the liquid crystal layer 20.

Thus, by adjusting the electric voltage applied between the transparent electrode 23 and the transparent electrode 24, the phase reversal element 2 can modulate the phase of light passing through the liquid crystal layer 20. Therefore, when a prescribed voltage in accordance with the wavelength of the incident light is applied between the transparent electrode 23 and the transparent electrode 24, the phase reversal element 2 can shift the phase of the light passing through the first annular portion 20a by $\pi$ with respect to the phase of light passing through the second annular portion 20b.

The polarization plane rotation element 3 converts the incident linear polarization light after passing through the phase reversal element 2 into radial polarization light which has radially distributed polarization plane of linear polarization with the optical axis OA as the center. To this end, the polarization plane rotation element 3 includes a liquid crystal layer 30, and transparent substrates 31, 32 disposed substantially in parallel on both sides of the liquid crystal layer 30 along the optical axis OA. One of the transparent substrate 31 and the transparent substrate 22 of the phase reversal element 2 may be omitted. In this case, the liquid crystal layer 20 is formed on one surface of the transparent substrate 22 and the liquid crystal layer 30 is formed on the other surface of the transparent substrate 22.

The polarization plane rotation element 3 has a transparent electrode 33 disposed between the transparent substrate 31 and the liquid crystal layer 30 and a transparent electrode 34 disposed between the liquid crystal layer 30 and the transparent substrate 32. The liquid crystal molecules 37 contained in the liquid crystal layer 30 are encapsulated between the transparent substrates 31, 32 and a sealing member 38. The transparent substrates 31, 32 are formed from material, for example, glass or resin, which is transparent to light having wavelength contained in a prescribed wavelength range. The transparent electrodes 33, 34 are formed from ITO, for example. In addition, an alignment film 35 is disposed between the transparent electrode 33 and the liquid crystal layer 30. An alignment film 36 is disposed between the transparent electrode 34 and the liquid crystal layer 30. These alignment films align the liquid crystal molecules 37 in a prescribed direction. The alignment film 35, 36 may be omitted in the case where the liquid crystal molecules 37 are aligned by methods such as in structural alignment not using an alignment film.

A frame 39 is further disposed on outer circumference of each substrate, each transparent electrode and each alignment film, and the frame 39 holds each substrate. The frame 29 and the frame 39 may be formed integrally in one unit.

The liquid crystal molecules encapsulated in the liquid crystal layer 30 are aligned, for example, in homogeneous alignment. The liquid crystal layer 30 includes a plurality of sector regions arranged in a plane perpendicular to the optical axis OA along circumferential direction with the intersection point c1 of the optical axis OA and the liquid crystal layer 30 as the center. Liquid crystal molecules 37 contained in each sector region are aligned such that they rotate the polarization plane of the incident linear polarization to a direction substantially parallel to the radial direction with the optical axis OA as the center.

Figure 7:
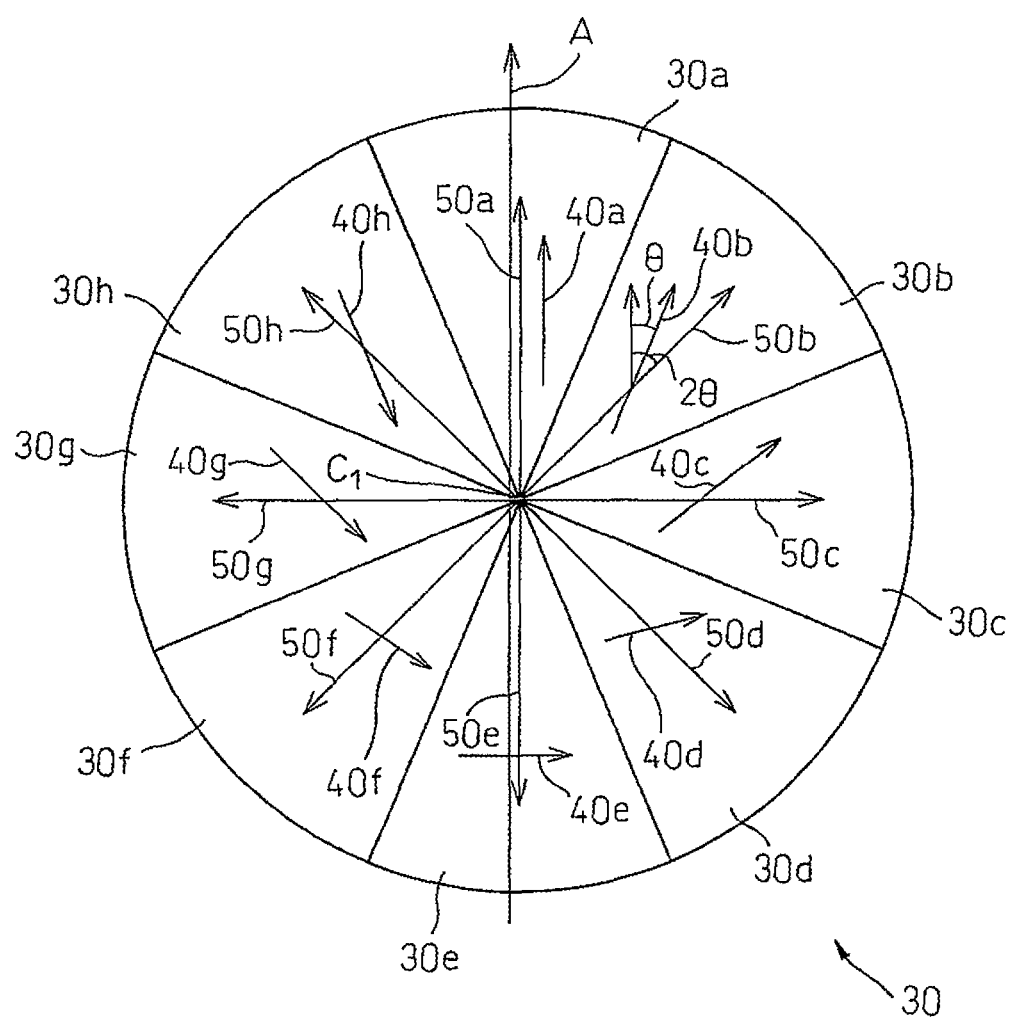
FIG. 7 is a view showing the alignment direction of liquid crystal in each region of the liquid crystal layer of the polarization plane rotation element, and the polarization direction of the linear polarization light component passing through each region.

FIG. 7 is a schematic front view showing the liquid crystal layer 30 in which alignment direction of liquid crystal in each sector region of the liquid crystal layer 30 and polarization direction of linear polarization light passing through each sector region are shown.

In the present embodiment, the liquid crystal layer 30 has eight sector regions 30a to 30h arranged in the order of clockwise rotation and having different alignment directions, the central angle of each of the sector regions 30a to 30h being set to be equal. In FIG. 7, the arrows 40a to 40h denote, respectively, the alignment direction of the liquid crystal molecules contained in the sector region 30a to 30h. The arrows 50a to 50h denote, respectively, polarization plane of linear polarization light exiting from each sector region 30a to 30h. Among the arrows 50a to 50h, two arrows with tip of the arrow pointing in opposite direction denote that the phases of the linear polarization light represented by the two arrows are shifted by $\pi$ from each other.

A straight line passing through the intersection point c1 of the optical axis OA and the liquid crystal layer 30 and bisecting the sector region will be hereinafter referred to as the center line of the sector region.

Alignment direction of each sector region 30a to 30h is determined such that, for example, polarization plane of linear polarization component having passing through the sector region is parallel to the center line of the sector region. The sector region 30a crossing a plane which passes the intersection point $C_1$ and parallel to the polarization plane A of the incident linear polarization light as the first region, for the n-th sector region in clockwise or anticlockwise rotation starting from the first region, an angle θ formed by the alignment direction of the n-th sector region and the polarization plane A of the polarization component passing through the sector region 30a is set in accordance with following equation.

$$\theta = 360° \times (n-1)/(2N) \ (n=1, 2, \ldots, N) \quad (1)$$

where N is total number of sector regions, and N=8 in the present embodiment.

For the sector region 30a for which n=1, θ=0. Thus, in the sector region 30a, alignment direction of the liquid crystal molecules is set substantially parallel to the polarization plane A of the incident linear polarization light so that the incident linear polarization light is transmitted without rotating the polarization plane of the incident linear polarization light.

Let the n-th sector region be a sector region arrived at in n-th order in clockwise rotation starting from the sector region 30a as the first region, then the alignment directions of respective sector regions 30b to 30h are set such that the angles formed by the alignment direction of respective sector regions 30b to 30h and the polarization plane A of the polarization component passing through the sector region 30a are, with clockwise rotation taken as positive, 22.5°, 45°, 67.5°, 90°, 112.5°, 135°, 157.5°.

Alternatively, let the n-th sector region be a sector region arrived at in n-th order in anti-clockwise rotation starting from the sector region 30a, then the alignment directions of respective sector regions 30b to 30h are set such that the angles formed by the alignment direction of respective sector regions 30b to 30h and the polarization plane A of the polarization component passing through the sector region 30a are, with clockwise rotation taken as positive, −157.5°, −135°, −112.5°, −90°, −67.5°, −45°, −22.5°.

The transparent electrodes 33, 34 are disposed so as to be opposed to each other with the entire liquid crystal layer 30 sandwiched therebetween. Between the transparent electrodes 33 and 34, a prescribed electric voltage is applied by the drive circuit 111 such that the sector regions 30a to 30h of the liquid crystal layer 30 function as half-wave plates for wavelength include in a prescribed wavelength range.

When an electric voltage is applied between the transparent electrodes 33 and 34, the liquid crystal molecules tilt in accordance with the applied voltage toward the direction parallel to the applied electric voltage. If the angle formed by the long axis of the liquid crystal molecule and the direction of applied voltage is ψ, then the light passing through the liquid crystal layer 30 forms an angle ψ with respect to the direction of the long axis. As described above, let $n_\psi$ be refractive index of the liquid crystal molecules for polarization component parallel to the alignment direction of the liquid crystal molecules, then $n_o \leq n_\psi \leq n_e$, where $n_o$ is refractive index for polarization component perpendicular to the long axis of the liquid crystal molecules, and $n_e$ is refractive index for polarization component parallel to the long axis of the liquid crystal molecules.

Therefore, if the liquid crystal molecules contained in the liquid crystal layer 30 is aligned in homogeneous alignment and the liquid crystal layer has thickness of d, optical path difference Δnd ($=n_\psi d - n_o d$) is produced between the polarization component parallel to the alignment direction of liquid crystal molecules and the polarization component orthogonal to the alignment direction of liquid crystal molecules. Thus, by adjusting the electric voltage applied between the transparent electrodes 33 and 34, the optical path difference between the polarization component parallel to the alignment direction of liquid crystal molecules and the polarization component orthogonal to the alignment direction of liquid crystal molecules can be adjusted. Therefore, by adjusting the electric voltage applied between the transparent electrodes 33 and 34, the sector regions 30a to 30h respectively function as half-wave plates for the desired wavelength.

When each sector region 30a to 30h functions as a half-wave plate, and linear polarization light having the polarization plane at an angle θ with respect to the alignment direction of the liquid crystal molecules 37 passes through the sector regions, the polarization plane is rotated so as to form an angle −θ with respect to the alignment direction of the sector region that transmitted the light. Thus, the polarization plane is rotated by an angle 2θ with the alignment direction as the center.

In the example shown in FIG. 7, the alignment direction of each sector region 30a to 30h is set such that the angle it forms relative to the polarization plane A of the linear polarization light incident on the sector region 30a is ½ of the angle formed by the center line of the sector region relative to the polarization plane A of the linear polarization light incident on the sector region 30a of the liquid crystal layer 30. Thus, with reference to the direction pointing from the intersection point c1 upward along the polarization plane A of the incident linear polarization light, and taking the direction of clockwise rotation as positive, the angle of the polarization plane of the linear polarization light passing through each of the sector regions 30a to 30h is, respectively, 0°, 45°, 90°, 135°, 180°, 225°, 270°, 315°. Thus, light exiting from the polarization plane rotation element 3 has radially directed linear polarization component with the optical axis OA as the center.

Figure 8:
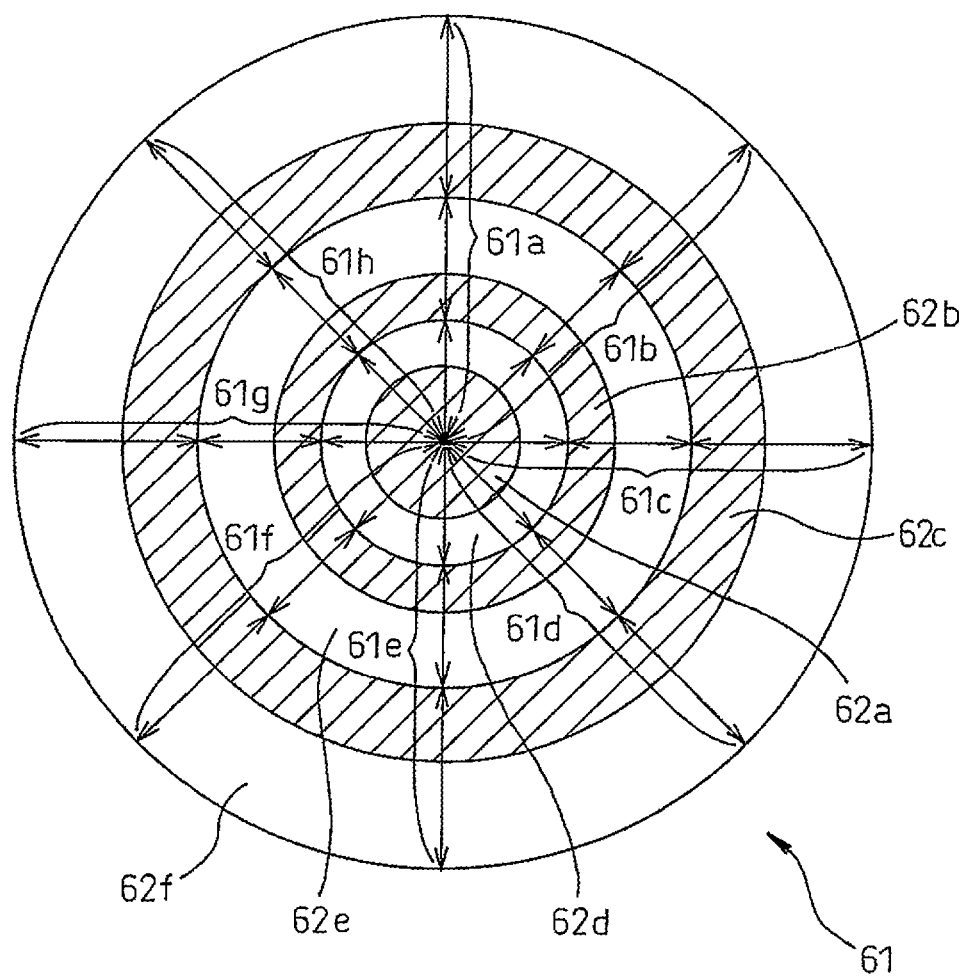
FIG. 8 is a schematic view showing radial polarization light exiting from the light modulator element according to the first embodiment of the present invention.

FIG. 8 is a view schematically showing radial polarization light exiting from the light modulator element 103. In FIG. 8, each of the arrows 61a to 61h represents linear polarization component, respectively. Among these arrows, two arrows with the tip pointing in opposite direction represent two linear polarization with the phase shifted by π relative to each other. Further, annular regions 62a to 62c represent, respectively, polarization component passing through the first annular portion of the phase reversal element 2. Annular regions 62d to 62f represent, respectively, polarization component passing through the second annular portion of the phase reversal element 2. Outer circumference of the annular region 62f corresponds to outer circumference of the region 2a shown in FIG. 4.

As shown in FIG. 8, this radial polarization 61 has 8 kinds of linear polarization components 61a to 61h having polarization plane in radial direction with respect to the optical axis OA. Each of the linear polarization components 61a to 61h is divided along radial direction to 6 divisions corresponding to components 62a to 62c passing through the first annular portion and to components 62d to 62f passing through the second annular portions with the phase shifted by π between adjoining divisions.

Polarization plane of the polarization component passing through each of sector regions 30a to 30h needs only to be distributed radially with the intersection point c1 as the center, and the polarization plane needs not be parallel to the center line of the sector region transmitting the light. Alignment direction of each of sector regions 30a to 30h needs only to be set such that the polarization plane of the polarization component passing through each of sector regions 30a to 30h is parallel to a prescribed line passing the intersection point c1 and the relevant sector region. For example, alignment direction of each of sector regions 30a to 30h may be set such that the angle formed by the alignment direction of each sector region 30a to 30h and the polarization plane A of the linear polarization incident on the sector region 30a has a value obtained from the above equation (1) plus a prescribed offset value. In this case, the prescribed offset value is set such that the angle obtained by adding twice the offset value to the angle formed by the center line of each sector region 30a to 30h and the polarization plane A (i.e., the angle formed by the polarization plane of the polarization component passing through the sector region and the polarization plane of the linear polarization incident on the sector region 30a) does not exceed the angle formed by the boundary of adjoining sector region and the polarization plane A, and for example, to ±5°.

Number of regions of different alignment directions included in the liquid crystal layer 30 of the polarization plane rotation element 3 is not limited to 8. Number of regions of different alignment directions included in the liquid crystal layer 30 may be any number as long as the effect of radial polarization can be obtained. The liquid crystal layer may include, for example, 4, 5, 6, or 16 regions of different alignment directions.

Figure 9:
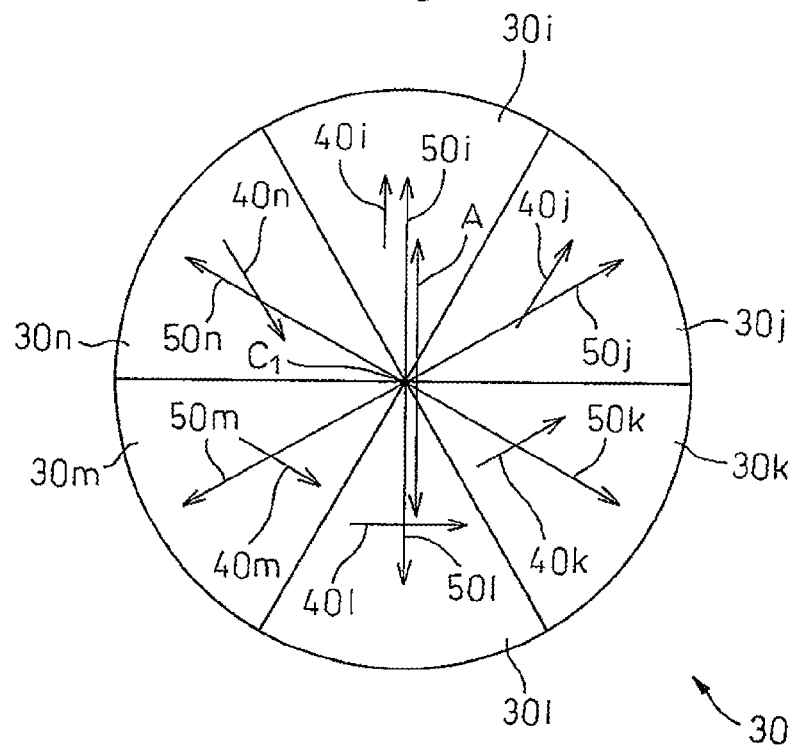
FIG. 9 is a view showing, in the case where the liquid crystal layer of the polarization plane rotation element has six regions with the alignment direction different from each other, alignment direction of the liquid crystal in each region and the polarization direction of the linear polarization light component passing through each region.

FIG. 9 is a schematic front view showing alignment direction of liquid crystal in each sector region and polarization direction of linear polarization light passing through each region when the liquid crystal layer 30 has six sector regions 30i to 30n. In this variant, the transparent electrodes 33, 34 are disposed so as to be opposed to each other with the entire liquid crystal layer 30 sandwiched therebetween.

In this variant, arrows 40i to 40n represent, respectively, alignment directions of liquid crystal molecules contained in each sector region 30i to 30n. Arrows 50i to 50n represent, respectively, polarization plane of linear polarization light exiting from each sector region 30i to 30n. Among the arrows 50i to 50n, two arrows in the same direction with tips pointing in an opposite direction represent two linear polarization lights with phase shifted by $\pi$ relative to each other.

In the sector region 30i, among the sector regions 30i to 30n, that is situated above the intersection point c1 of the optical axis OA and the liquid crystal layer 30, the polarization plane A of the incident linear polarization coincides with the center line of the sector region 30i. Thus, the sector region 30i is numbered as the first region. Then, the alignment direction of the n-th sector region numbered in clockwise rotation is set, for example, such that the angle formed by the alignment direction and the polarization plane A is an angle calculated in accordance with the equation (1) above.

In this case, the angles formed by the alignment direction of respective sector regions 30i to 30n and the polarization plane A of the polarization component passing through the sector region 30a are respectively 0°, 30°, 60°, 90°, 120°, 150°, taking clockwise rotation as positive.

In this case, too, an electric voltage in accordance with the wavelength of incident light is applied between the transparent electrodes 33, 34 sandwiching the sector regions 30i to 30n such that the liquid crystal layer 30 functions as a half-wave plate for linear polarization light passing through each of the sector regions 30i to 30n.

With this electric voltage, with reference to the direction pointing upward from the intersection point c1 along the polarization plane of the incident linear polarization, and taking the direction of clockwise rotation as positive, the angles of polarization plane of linear polarization component passing through the sector regions 30i to 30n are, respectively, 0°, 60°, 120°, 180°, 240°, 300°. Thus, the light beam exiting from the polarization plane rotation element 3 has a linear polarization component distributed radially with the optical axis OA as the center.

Figure 10:
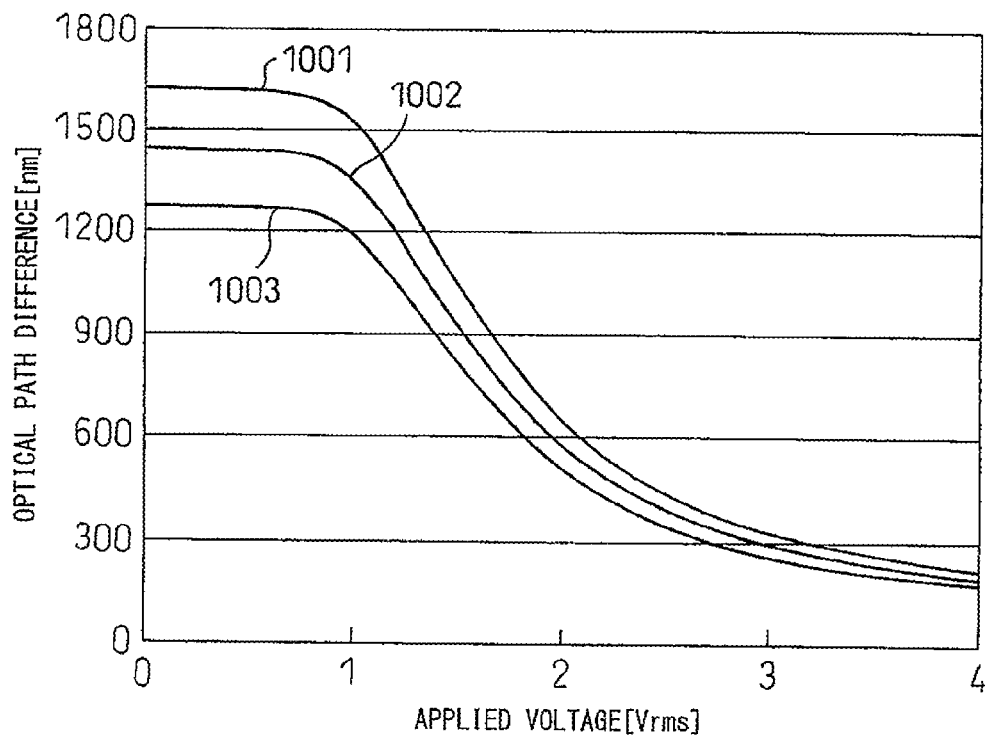
FIG. 10 is a view showing an example of electric voltage applied to the liquid crystal layer between the transparent electrodes of the polarization plane rotation element and the difference of optical path length between an ordinary ray and an extraordinary ray.

FIG. 10 is a view showing an example of an electric voltage applied to the liquid crystal layer 30 between the transparent electrodes 33, 34 and the optical path difference between ordinary ray and extraordinary ray produced in the liquid crystal layer 30.

In FIG. 10, horizontal axis represents the electric voltage applied to the liquid crystal layer 30 and vertical axis represents the optical path difference. Graph 1001 shows the relationship between the applied voltage and the optical path difference for light having wavelength of 405 nm. Graph 1002 shows the relationship between the applied voltage and the optical path difference for light having wavelength of 650 nm. Graph 1003 shows the relationship between the applied voltage and the optical path difference for light having wavelength of 780 nm.

For example, for light having wavelength of 405 nm, in order for the liquid crystal layer 30 to be able to function as a half-wave plate, an electric voltage that produces the optical path difference of integer multiple of 405 nm plus 202.5 nm has to be applied between the transparent electrodes 33, 34. Referring to the graph 1001, it is sufficient to apply an electric voltage of about 1.4 Vrms corresponding to the optical path difference of 1012.5 nm between the transparent electrodes 33, 34.

Also, for light having wavelength of 650 nm, for example, in order for the liquid crystal layer 30 to be able to function as a half-wave plate, an electric voltage that produces the optical path difference of integer multiple of 650 nm plus 325 nm has to be applied between the transparent electrodes 33, 34. Referring to the graph 1002, it is sufficient to apply an electric voltage of about 1.5 Vrms corresponding to the optical path difference of 975 nm between the transparent electrodes 33, 34.

Further, for light having wavelength of 780 nm, for example, in order for the liquid crystal layer 30 to be able to function as a half-wave plate, an electric voltage that produces the optical path difference of integer multiple of 780 nm plus 390 nm has to be applied between the transparent electrodes 33, 34. Referring to the graph 1003, it is sufficient to apply an electric voltage of about 1.1 Vrms corresponding to the optical path difference of 1170 nm between the transparent electrodes 33, 34.

If the direction of the polarization plane of actually incident linear polarization light deviates from the direction of the polarization plane set in advance for light incident on the light modulator element 103 (the direction indicated by the arrow A in FIG. 4), the polarization plane of the linear polarization light is rotated by transmission through the phase reversal element 2. In the liquid crystal layer 20 of the phase reversal element 2, birefringence differs between the portion where an electric voltage is applied using the annular electrode and the remaining portion. As a result, the amount of rotation of the polarization plane of the linear polarization differs depending on with the portion of the liquid crystal layer transmitting the light. Therefore, the polarization plane rotation element 3 cannot converts the light exiting from the phase reversal element 2 to radial polarization light.

Thus, the polarizer plate 4 is used to confirm the deviation of the polarization plane of the linear polarization light actually incident on the light modulator element 103 from the direction of the polarization plane set in advance for incident light on the light modulator element 103. Therefore, the polarizer plate 4 is installed on the incidence side of the phase reversal element 2 so as to permit it to be inserted into the light flux incident on the phase reversal element 2 or to be retreated from the incident light flux.

In the present embodiment, the direction of the polarization plane set in advance for incident light is the direction in which the phase reversal element 2 does not rotates the polarization plane of the incident linear polarization light, i.e., the alignment direction of the liquid crystal molecules contained in the liquid crystal layer 20 of the phase reversal element 2.

Figure 11A:
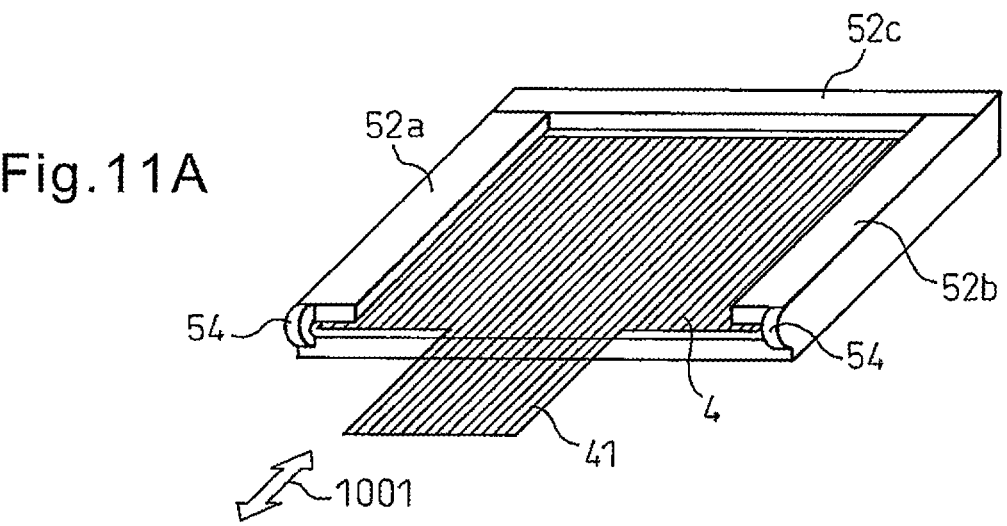
FIG. 11A is a schematic perspective view showing the polarizer plate and the guide rail when the polarizer plate is inserted into light flux incident on the phase reversal element.
Figure 11B:
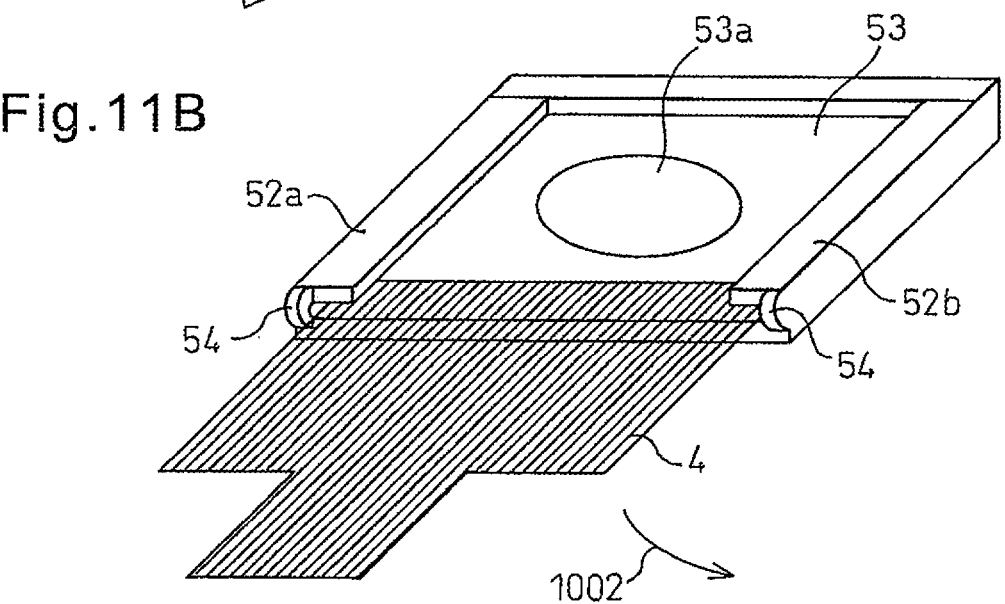
FIG. 11B is a schematic perspective view showing the polarizer plate and the guide rail when the polarizer plate is retreated out of light flux incident on the phase reversal element.
Figure 11C:
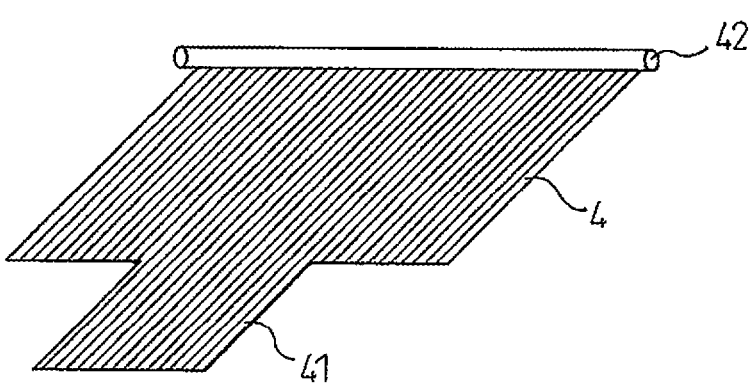
FIG. 11C is a schematic perspective view showing the polarizer plate.

FIG. 11A is a schematic perspective view showing the polarizer plate 4 and the guide rail 52 in a state where the polarizer plate 4 is inserted in the light flux incident on the phase reversal element 2, FIG. 11B is a schematic perspective view showing the polarizer plate 4 and the guide rail 52 in a state where the polarizer plate 4 is retreated from the light flux incident on the phase reversal element 2, and FIG. 11C is a schematic perspective view showing the polarizer plate 4.

The polarizer plate 4 transmits, from among the incident light flux, only the linear polarization component having polarization plane in a specified direction. The polarizer plate 4 may be, for example, a wire-grid-type polarizer plate, or a thin film type polarizer plate formed by impregnating a polyvinyl alcohol with an iodine and expanding the polyvinyl alcohol.

The polarizer plate 4 is formed in a convex shape having a substantially rectangular main body of the polarizer plate 4 with a projecting portion 41 of smaller width than the main body provided at one end of the main body. A stopper 42 of substantially cylindrical shape is provided along the other end opposite to the end provided with the projecting portion 41. The stopper 42 serves to prevent the polarizer plate 4 from falling off from the rotation support member 5. Therefore, length of the stopper 42 is larger than width of the polarizer plate 4.

The polarizer plate 4 is inserted into the U-shaped guide rail 52 attached to three sides of a substantially rectangular plate member 53 provided on an end of the rotation support member 5 on the side nearer to the phase reversal element 3 along a surface substantially perpendicular to the optical axis OA. For the sake of convenience, two rails adjoining the open end of the guide rail 52 will be referred to as the left rail 52a and the right rail 52b, respectively, and the rail on the opposite side to the open end will be referred to as the recessed rail 52c. Separation of the two opposed sides of the plate member 53 is larger than the diameter of light flux incident on the phase reversal element 2 so that separation of the let and the right rails is also larger than the diameter of light flux incident on the phase reversal element 2. In addition, the recessed rail 52c is disposed so as to remain outside the light flux. In the center portion of the plate member 53, a substantially circular opening 53a having diameter larger than the diameter of light flux incident on the phase reversal element 2 is formed so as not to interrupt the light flux incident on the phase reversal element 2.

The polarizer plate 4 is inserted into the guide rail 52 such that the stopper 42 is opposed to the recessed rail 52c and the projecting portion 41 is situated on the open end side of the guide rail 52 with both ends of the stopper 42 engaged with the left and the right rails 52a, 52b of the guide rail 52. Thus, the polarizer plate 4 is supported movably along the left and the right rails 52a, 52b as shown in the arrow 1001. A user can grasp the projecting portion 41 and move the polarizer 4. When the polarizer plate 4 is inserted along the rails 52a, 52b into the deepest position of the guide rail 52 such that the entire light flux incident on the light modulator element 103 passes through the polarizer plate 4, the stopper 42 abuts against the recessed rail 52c of the guide rail 52.

On the ends of the left and the right rails 52a, 52b of the guide rail 52 on the side of the open end, fall-off prevention members 54 in the shape of a substantially half circular arc convex toward the open end and having diameter larger than the outer diameter of the stopper 41 are provided. Separation of the fall-off prevention members 54 provided on the left and the right rail 52a, 52b is shorter than the length of the stopper 42 and larger than the width of the polarizer plate 4. Therefore, when the polarizer plate 4 is drawn out to the open end side of the guide rail 52 so as to position the polarizer plate outside the light flux incident on the light modulator element 103, the stopper 42 is blocked by the fall-off prevention members 54. Then, the polarizer plate 4 can be rotated by about 90 toward the rotation support member 5 with the stopper 42 as the rotation axis, as shown by the arrow 1002. Thus, the polarizer plate 4 becomes substantially parallel to the optical axis OA, so that, when the polarizer plate 4 is not used, installation space of the light modulator element 103 is reduced.

Figure 12:
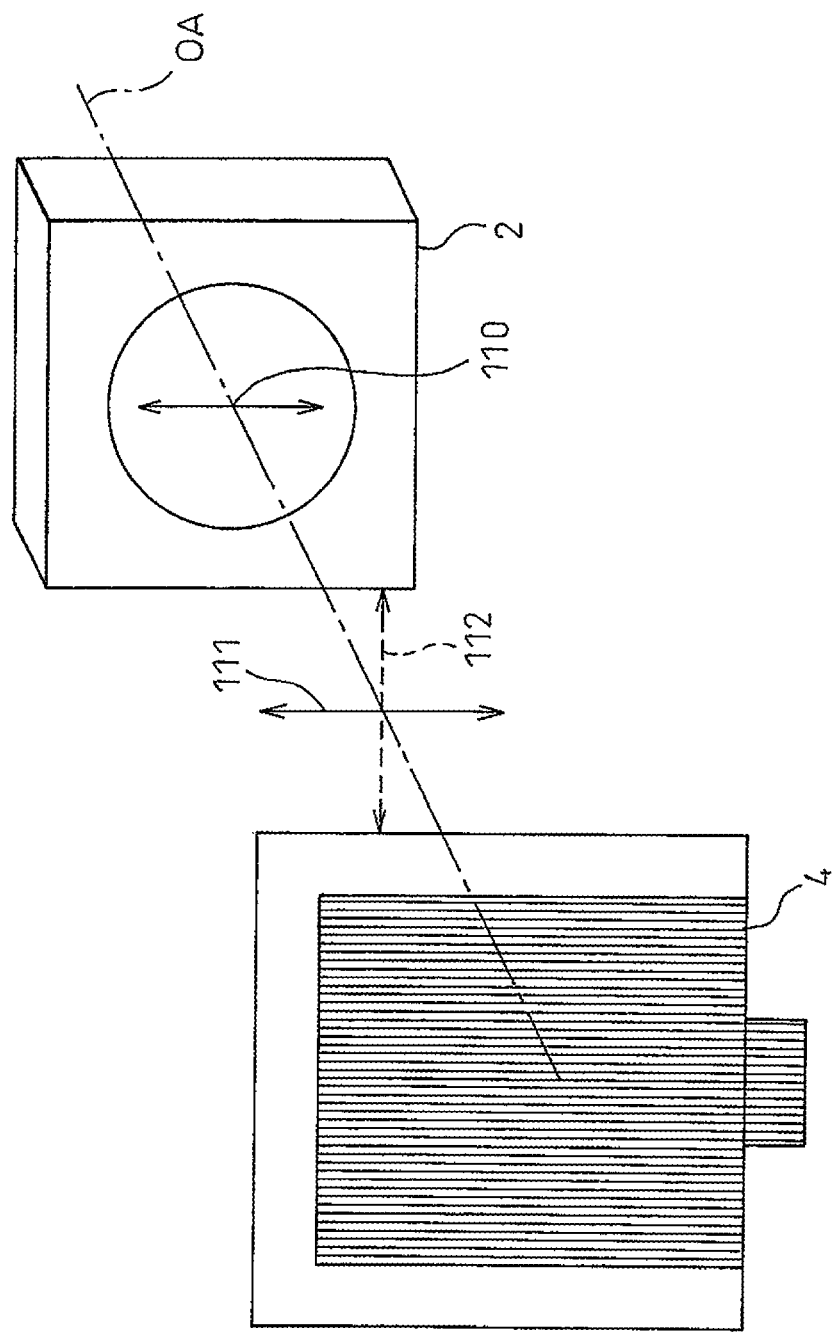
FIG. 12 is a schematic diagram showing the relationship between the transmission axis of the polarizer plate and the alignment direction of the liquid crystal molecules of the phase reversal element.

FIG. 12 is a schematic view showing the relationship of the transmission axis of the polarizer plate 4 and the alignment direction of liquid crystal molecules of the phase reversal element 2 when the polarizer plate 4 is disposed to be situated in the light flux incident on the light modulator element 103. In FIG. 12, the arrow 110 represents the alignment direction of liquid crystal molecules of the phase reversal element 2, and the arrow 111 represents the direction of the transmission axis of the polarizer plate 4.

According to an example, as shown in FIG. 12, the polarizer plate 4 is disposed such that the transmission axis of the polarizer plate 4 is parallel to the alignment direction of liquid crystal molecules of the phase reversal element 2, i.e., the transmission axis of the polarizer plate 4 coincides with the direction in which the phase reversal element 2 which does not rotate the polarization plane. Linear polarization light emitted from the light source 101 of the laser microscope 100 is incident on the light modulator element 103 from the side of the polarizer 4. At this time, the intensity of light exiting from the light modulator element 3 is highest when the polarization plane of the linear polarization light is parallel to the alignment direction of liquid crystal molecules of the phase reversal element 2. As has been described above, the guide rail 52 is fixedly provided on one end of the rotation support member 5, so that, when the rotation support member 5 is rotated, the direction of the transmission axis of the polarizer plate 4 is also rotated with the optical axis OA as the rotation axis. Even if the rotation support member 5 is rotated, the angle formed by the alignment direction of liquid crystal molecules of the phase reversal element 2 and the transmission axis of the polarizer plate remains constant.

Therefore, when a user adjusts the incident direction of the polarization plane of the light modulator element 103 with respect to the polarization plane of actually incident linear polarization light, light exiting from the light modulator element 103 is focused, for example, by an objective lens 104 of the laser microscope on the image sensor disposed at the position of the specimen 105. The user rotates the rotation support member 5 while monitoring the focused light intensity outputted by the image sensor with the image obtained by the image sensor displayed on a display device, and determines the position at which the intensity is highest. The user can fix the rotation support member 5 at this position in order to bring the polarization plane of the linear polarization incident on the light modulator element 103 parallel to the alignment direction of liquid crystal molecules of the phase reversal element 2.

According to another example, the polarizer plate 4 may be disposed such that, as shown by the dotted arrow 112, the transmission axis of the polarizer plate 4 is orthogonal to the alignment direction of liquid crystal molecules of the phase reversal element 2, i.e., the transmission axis of the polarizer plate 4 is orthogonal to the direction in which the phase reversal element 2 does not rotate the polarization plane. With such arrangement of the polarizer plate 4, when the linear polarization light emitted from the light source 101 of the laser microscope 100 is incident on the light modulator element 103 from the side of the polarizer plate 4, the intensity of light exiting from the light modulator element 103 is lowest if the polarization plane of the linear polarization is parallel to the alignment direction of the liquid crystal molecules of the phase reversal element 2. Therefore, a user rotates the rotation support member 5 while monitoring the intensity of light exiting from the light modulator element 103, and determines the position at which the intensity is lowest. The user can fix the rotation support member 5 at this position in order to bring the polarization plane of the linear polarization incident on the light modulator element 103 parallel to the alignment direction of liquid crystal molecules of the phase reversal element 2.

After adjustment of the direction of the polarization plane incident on the light modulator element 103 has been completed, the user can retreat the polarizer plate 4 from the light flux incident on the light modulator element 103.

Direction of the long axis of individual liquid crystal molecule is more parallel to the alignment direction when an electric voltage is applied to the liquid crystal layer than when there is no electric voltage applied to the liquid crystal layer. The more parallel the long axis of individual liquid crystal molecule to the alignment direction is, the more sensitive the intensity variation of the focused light outputted from the image sensor associated with the variation of the angle formed by the incident linear polarization relative to the alignment direction is, and therefore, by carrying out the above described procedure of alignment adjustment while a certain electric voltage is applied to the liquid crystal layer 20 of the phase reversal element 2, the incident linear polarization can be more strictly brought into coincidence with the alignment direction. Alternatively, the phase reversal element 2 may be rotated at first in a state with no electric voltage applied to the liquid crystal layer 20 of the phase reversal element 2 to bring the incident linear polarization substantially in coincidence with the alignment direction of liquid crystal molecules of the liquid crystal layer 20 of the phase reversal element 2, and then the phase reversal element 2 may be rotated in a state with an electric voltage applied to the liquid crystal layer 20 of the phase reversal element 2 to achieve strict coincidence of the incident linear polarization with the alignment direction of liquid crystal molecules of the liquid crystal layer 20.

As has been described above, the light modulator element according to a first embodiment of the present invention can bring the incident direction of the polarization plane preset for the light modulator element, i.e., the alignment direction of liquid crystal of the phase reversal element into coincidence with the polarization plane of actually incident linear polarization light. In adjusting the incident direction of the light modulator element, a user needs only to monitor the intensity of light exiting from the light modulator while rotating the rotation support member in order to detect the position at which the incident direction of the light modulation element coincides with the polarization plane of actually incident linear polarization light. Thus, the light modulator element facilitates adjustment of alignment of the light modulator element with the light source of the light irradiation apparatus.

According to a variant of this embodiment, the light modulator element may be disposed between a collimating optical system and a beam splitter.

Next, a light modulator element according to a second embodiment will be described. The light modulator element according to a second embodiment is used for correcting the wave front aberration produced in an optical system of a laser microscope.

Referring again to FIG. 1, an objective lens 104 is designed for optimal imaging performance in accordance with the optical path length including not only the interior of the lens system but also considering refractive index and separation of the optical path from the lens front to the observation plane, including thickness of a cover glass or presence/absence of the cover glass. Therefore, an actual optical path length may deviate from the designed optical path length due to production tolerance of the cover glass, etc., which increases the aberration of the optical system, leading to degradation of imaging performance. Thus, in the second embodiment, the imaging performance is improved by imparting phase distribution to the light modulator element to thereby cancel the wave front aberration due to deviation of actual optical path from the design value.

In general, due to space restriction, the light modulator element cannot be positioned at the entrance pupil position of the objective lens, so that a relay lens system is used to place the light modulator element at a position conjugate to the entrance pupil. Since light flux exiting from the laser light source passes the light modulator element twice, i.e., in forward and backward paths, the light modulator element corrects the phase of the light flux both in forward path and in backward path. On the other hand, an objective lens of a microscope is designed generally as an infinite system, so that light flux incident on the objective lens is parallel light beam. Therefore, in order to obtain the effect of correction, the light modulator element is disposed on the light source side of the objective lens, and as near as possible to the objective lens.

Figure 13:
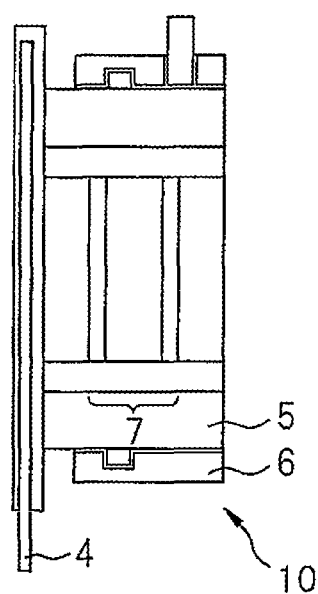
FIG. 13 is a schematic side sectional view showing a light modulator element according to a second embodiment of the present invention.

FIG. 13 is a schematic side sectional view showing a light modulator element according to the second embodiment, which is used in place of, or in addition to, the light modulator element 103 according to the first embodiment. The light modulator element 10 includes a phase modulation element 7, a polarizer plate 4, a rotation support member 5, and a casing 6. Of these, the phase modulation element 7 is a liquid crystal element. External shape of the light modulator element 10 according to the second embodiment and the construction of the rotation support member 5 and the casing 6 are similar to the light modulator element 1 according to the first embodiment. Therefore, as for external shape of the light modulator element 10, etc., reference is made to FIG. 2A, FIG. 2B, FIG. 3A, FIG. 3B, and related description.

The light modulator element 10 according to the second embodiment differs from the light modulator element 10 according to the first embodiment in that the structure and function of the transparent electrodes of the phase modulation element 7 which is a liquid crystal element housed in the casing 6 is different from the structure and function of the transparent electrodes of the phase reversal element 2. In the second embodiment, the phase modulation element 7 is the only liquid crystal element of the light modulator element 10. In the description that follows, the transparent electrodes of the phase modulation element 7 and associated parts will be described. As for parts of the phase modulation element 7 other than the transparent electrodes, reference is made to description of the phase reversal element 2.

The phase modulation element 7 has, as the phase reversal element 2, two transparent substrates and a liquid crystal layer sandwiched between these transparent substrates. The liquid crystal molecules encapsulated in the liquid crystal layer are aligned, for example, in a homogeneous alignment. Further, a transparent electrode is provided, respectively, between the liquid crystal layer and each transparent substrate, and by adjusting an electric voltage applied between the two transparent electrodes, phase distribution can be imparted to the light flux passing through the phase modulation element 7 so as to cancel the aberration produced in the optical system of the laser microscope 100.

Figure 14:
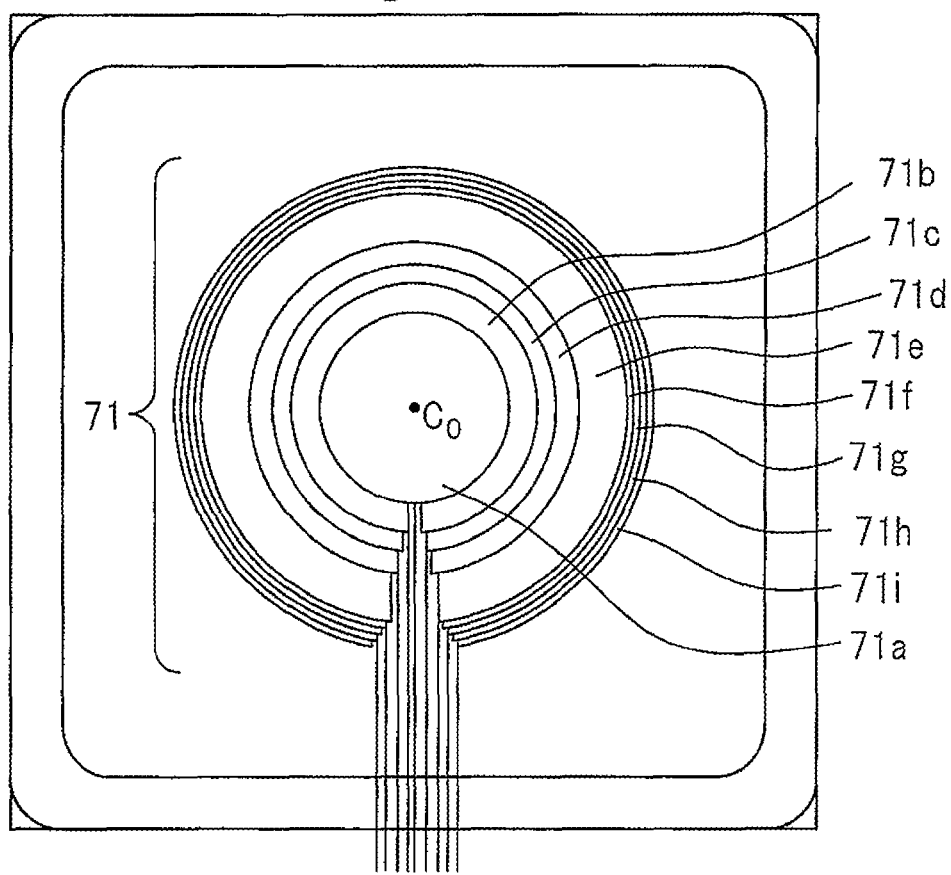
FIG. 14 is a schematic front view showing an example of the construction of one of the two transparent electrodes of the phase modulation element of the light modulator element according to the second embodiment.

FIG. 14 is a schematic front view showing an example of the construction of one of the two transparent electrodes of the phase modulation element 7. The other of two transparent electrodes of the phase modulation element 7 is formed so as to cover the entire liquid crystal layer, for example. Alternatively, both transparent electrodes may have the form as shown in FIG. 14.

As shown in FIG. 14, the transparent electrode 71 has a circular electrode 71a and a plurality of concentric annular electrodes 71b to 71i with the intersection point $c_0$ of the optical axis OA and the phase modulation element 7 as the center. Outer circumference of the annular electrode 71i corresponds to the outer circumference of the active region in which liquid crystal molecules are driven. Diameter of the active region is designed, for example, so as to come substantially in coincidence with the pupil diameter of the objective lens 104.

In the example shown in FIG. 14, in order to be able to control the circular electrode 71a and annular electrodes 71b to 71i independently, a wiring is extracted respectively from the circular electrode 71a and annular electrodes 71b to 71i and is connected to the drive circuit 111. Further, the circular electrode 71a and annular electrodes 71b to 71i are disposed in separation so as to be insulated from each other. By controlling electric voltage applied to the liquid crystal layer via the circular electrode 71a and annular electrodes 71b to 71i, optical path length can be varied individually for each annular region of the liquid crystal layer corresponding to the circular electrode 71a and annular electrodes 71b to 71i. As a result, the light modulator element 10 can give desired concentric phase distribution to the light flux passing through the phase modulation element 7.

The diameter of the circular electrode 71a and the width of each of the annular electrodes 71b to 71i are set, for example, by dividing the phase distribution profile along the diameter of the light flux at an equal phase interval. Thus, it is preferable that the annular zone corresponding to position of larger change of phase modulation relative to change of distance from the optical axis be set narrower.

Each of the circular electrode 71a and the annular electrodes 71b to 71i may be connected to adjoining annular electrode with an electrode having same electrical resistance (resistor). In this case, the annular electrodes corresponding to the position of maximum phase modulation and to the position of minimum phase modulation are determined from the desired phase distribution. An electric potential corresponding to the maximum phase modulation is given to the annular electrode or the circular electrode at the position of maximum phase modulation. On the other hand, an electric potential corresponding to the minimum phase modulation is given to the annular electrode or the circular electrode at the position of minimum phase modulation. As a result, the potential difference between adjoining annular electrodes becomes equal due to the resistance division. Therefore, the phase modulation element 7 can be driven with a simpler drive circuit than when each annular electrode is driven independently.

Figure 15A:
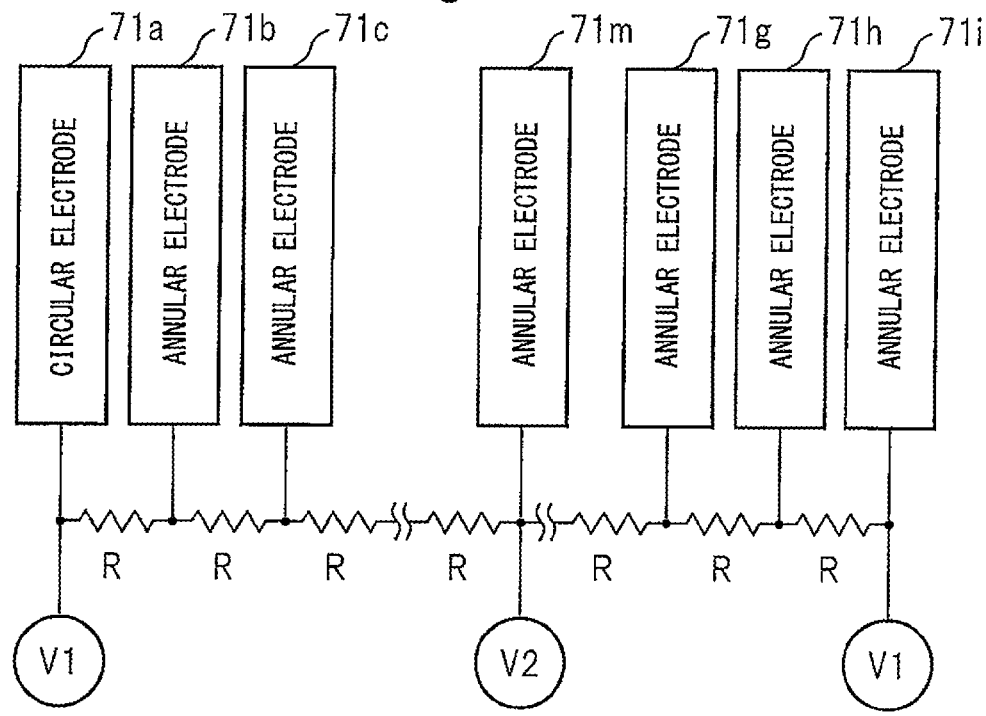
FIG. 15A and FIG. 15B are, respectively, views showing an example of electrodes with electric voltage applied thereto in the phase modulation element having a circular electrode and n annular electrodes.
Figure 15B:
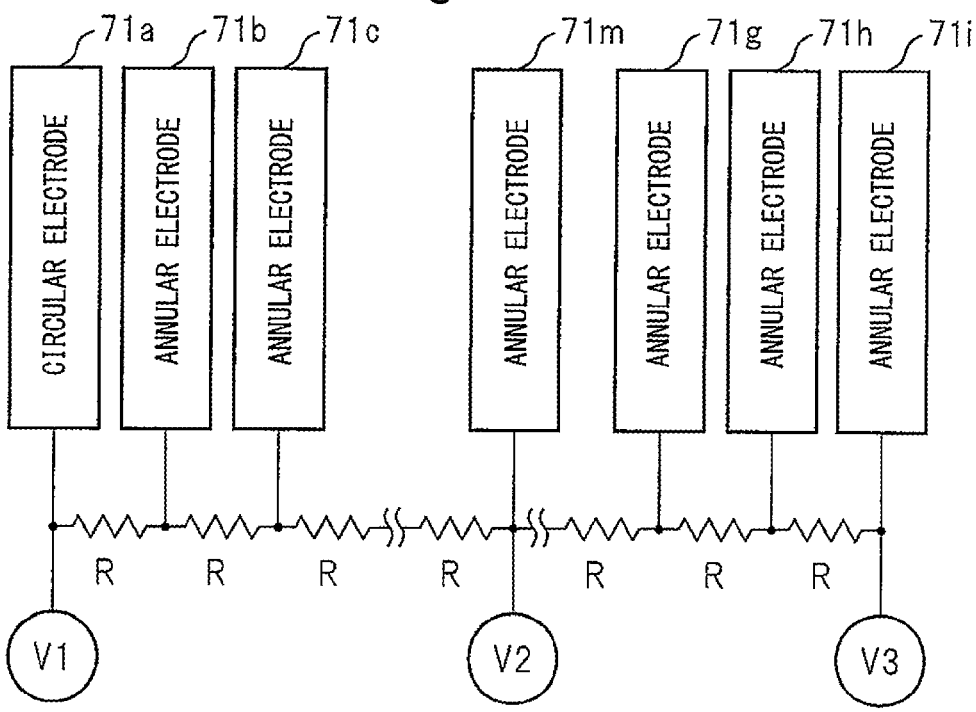

FIG. 15A and FIG. 15B are, respectively, views showing an example of electrode in the phase modulation element 7 having an electric voltage applied thereto. In FIG. 15A and FIG. 15B, the electrode 71a is the central circular electrode and the annular electrode 71i is the annular electrode of the outermost circumference. The electrode 71m representing some of the annular electrodes 71b to 71h is the annular electrode having highest potential given thereto. Adjoining annular electrodes are connected to each other via a resistor of resistance R.

In FIG. 15A, each electrode is driven by voltage with two levels. The same lowest potential V1 is given to the center circular electrode 71a and to the annular electrode 71i at the outermost circumference. On the other hand, the highest potential is given to the annular electrode 71m. By choosing the defocus value between the spot of light focused by the objective lens 104 and the object position for observation such that the phase at the center and at the end position in the phase distribution of wave front aberration produced in the optical system of the laser microscope 100 are equal, the phase of the light flux passing through the center circular electrode 71a and the phase of the light flux passing through the annular electrode 71i at the outermost circumference can be brought into coincidence. In this case, as shown in FIG. 15A, with same potential given to the center circular electrode 71a and to the annular electrode 71i at the outermost circumference, phase modulation which can cancel the phase distribution produced by the wave front aberration can be produced by the liquid crystal layer. In this way, in the example of two level driving, by varying the potential difference between the lowest potential V1 and the highest potential V2, magnitude of phase modulation in regions in the liquid crystal layer corresponding to each annular electrode can be changed without changing the shape of phase modulation profile.

In contrast, in FIG. 15B, each electrode is driven by a voltage in three levels. In this construction, a potential V3 given to the annular electrode 71i at the outermost circumference differs from the potential V1 given to the circular electrode 71a. By giving a potential V3 to the annular electrode 71i at the outermost circumference different from the potential V1 so as to produce an arbitrary phase modulation, even when an objective lens of different numerical aperture NA is used as the objective lens 104, the phase modulation element 7 can produce different distribution of phase modulation for different objective lens. Therefore, the phase modulation element 7 can compensate the wave front aberration in high precision in accordance with the objective lens used.

Figure 16A:
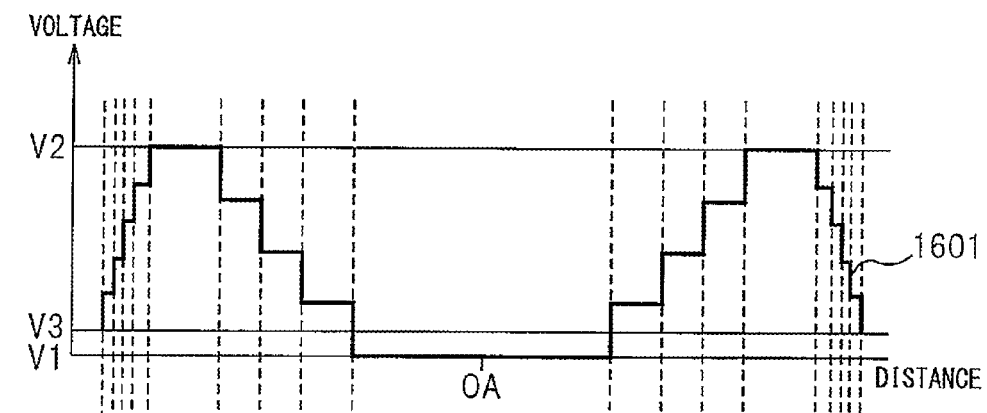
FIG. 16A is a view showing an example of the distribution of electric voltage applied between each of the annular electrodes and the opposed transparent electrode of the phase modulation element in order to correct wave front aberration produced in an optical system including an objective lens.
Figure 16B:
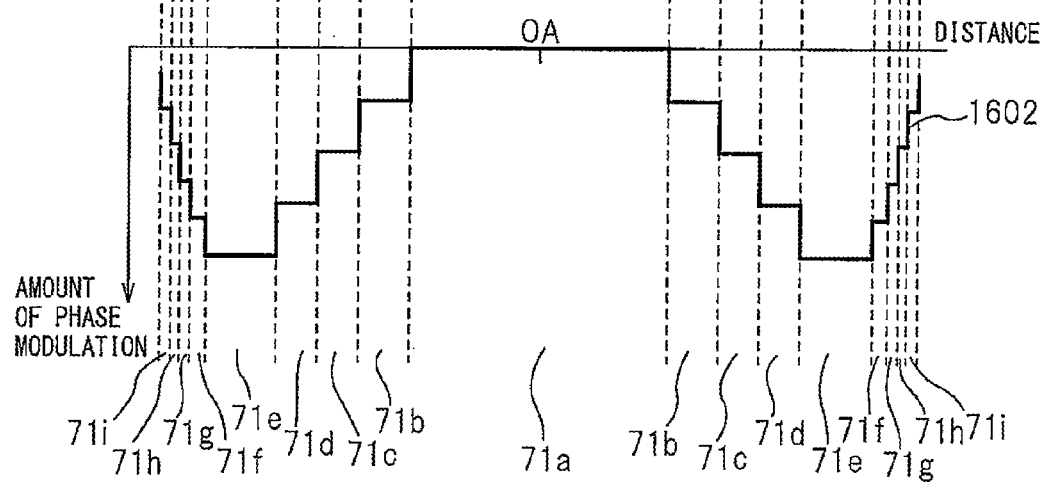
FIG. 16B is a view showing an example of the distribution of the amount of phase modulation produced by the phase modulation element in accordance with the distribution of electric voltage shown in FIG. 16A.

FIG. 16A is a view showing an example of voltage distribution applied between each annular electrode and the opposing transparent electrode of the phase modulation element 7 in order to correct the wave front aberration produced by the optical system including the objective lens, and FIG. 16B is a view showing an example of the distribution of phase modulation amount produced by the phase modulation element 7 in accordance with the distribution of electric voltage shown in FIG. 16A. In FIG. 16A and FIG. 16B, the horizontal axis represents distance from the optical axis, and the regions 71a to 71i correspond respectively to the circular electrode 71a and the annular electrodes 71b to 71i. In FIG. 16A, the vertical axis represents the electric voltage applied between electrodes. Graph 1601 shows the distribution of electric voltage in accordance with the distance from the optical axis. On the other hand, in FIG. 16B, the vertical axis represents the amount of phase modulation, and lower position corresponds to more retarded phase. Graph 1602 shows the distribution of the amount of phase modulation produced by the phase modulation element 7 in accordance with the distance from the optical axis. In this example, the amount of phase modulation for center portion differs from that for the outermost circumference, so that the electric voltage is preferably driven in 3 levels.

As shown by graphs 1601 and 1602, the higher the electric voltage between electrodes, the larger is the amount of phase modulation.

Each time the objective lens is exchanged, the ratio of the electric potential V1, V2 and V3 given to the circular electrode 71$a$, the annular electrode 71$m$ and the annular electrode 71$i$ is set again so as to cancel the phase distribution corresponding to the wave front aberration produced in the optical system. Final adjustment of electric voltage may be done manually, for example, while watching the image, or the optimum electric voltage may be set automatically by obtaining information such as the contrast, etc., of the image with a controller (not shown) and feeding back the information to applied electric voltage.

A laser microscope generally includes a plurality of laser light sources of different wavelength, and required amount of phase modulation is different for different laser light sources. Difference of the amount of phase modulation due to difference of wavelength can be accommodated by changing the electric voltage applied to the liquid crystal layer. Further, difference of the amount of phase modulation due to temperature variation can be cancelled by appropriate adjustment of applied electric voltage.

As has been described above, the phase modulation element 7 in the light modulator element 10 according to the second embodiment has, as the phase reversal element 2 in the first embodiment, a liquid crystal layer containing liquid crystal molecules in homogeneous alignment in a specified direction. If the polarization plane of linear polarization light incident on the phase modulation element 7 is inclined relative to the alignment direction, the amount of phase modulation varies in accordance with the inclination. Therefore, in order to impart phase distribution as designed to the light flux passing through the phase modulation element 7, it is preferable that the polarization plane of the linear polarization light incident on the phase modulation element 7 coincides with the alignment direction of the liquid crystal molecules.

Positional relationship of the polarizer plate 4, the rotation support member 5 and the casing 6 relative to the phase modulation element 7 is the same as positional relationship of the polarizer plate 4, the rotation support member 5 and the casing 6 relative to the phase reversal element 2 in the first embodiment. The polarizer plate 4 is disposed such that the transmission axis of the polarizer plate 4 is parallel to or orthogonal to the alignment direction of the phase modulation element 7. Therefore, by carrying out the same procedure as the adjustment procedure for incident polarization direction in the light modulator element 1 in the first embodiment, the polarization plane of the linear polarization light incident on the phase modulation element 7 can be made to coincide with the alignment direction of the liquid crystal of the phase modulation element 7 in the light modulator element 10 according to the second embodiment.

In a variant of the second embodiment, the light modulator element may have a plurality of phase modulation elements arranged side by side along the optical axis. Each of the phase modulation elements may impart different phase modulation amount to the light flux passing through the phase modulation element, respectively, so as to correct different types of wave front aberration.

Figure 17:
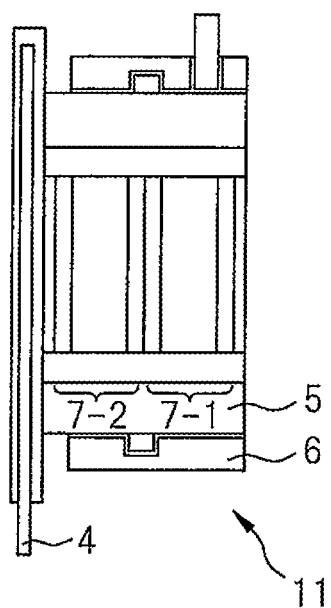
FIG. 17 is a schematic side sectional view showing a light modulator element according to a variant of the second embodiment.

FIG. 17 is a schematic side sectional view showing a light modulator element according to a variant of the second embodiment. The light modulator element 11 includes two phase modulation elements 7-1 and 7-2, a polarizer plate 4, a rotation support member 5 and a casing 6. Of these, the phase modulation elements 7-1 and 7-2 are liquid crystal elements. External form of the light modulator element 11 according to the second embodiment and structure of the rotation support member 5 and the casing 6 are similar to the light modulator element 1 according to the first embodiment, and therefore, for the external form of the light modulator 11, etc., reference is made to FIG. 2A, FIG. 2B, FIG. 3A and FIG. 3B and to related description.

The phase modulation element 7-1 and the phase modulation element 7-2 may have, for example, same construction as the phase modulation element 7 according to the second embodiment. The phase modulation element 7-1 and the phase modulation element 7-2 are disposed such that the alignment direction of liquid crystal molecules contained in the liquid crystal layer of the phase modulation element 7-1 and the alignment direction of liquid crystal molecules contained in the liquid crystal layer of the phase modulation element 7-2 are parallel to each other.

Therefore, in the light modulator element 11 according to this variant, by carrying out the same procedure as the adjustment procedure for incident polarization direction in the light modulator element 1 in the first embodiment, the polarization plane of the linear polarization light incident on the phase modulation elements 7-1 and 7-2 can be made to coincide with the alignment direction of the liquid crystal of the phase modulation elements 7-1 and 7-2.

The phase modulation element 7-1 and the phase modulation element 7-2 may have both, for example, concentric annular electrodes as shown in FIG. 14. In this case, by varying the electric potential applied to each annular electrode of the phase modulation element 7-1 from the electric potential applied to each annular electrode of the phase modulation element 7-2, the phase modulation element 7-1 may impart the distribution of phase modulation to the light flux for correcting third order spherical aberration, and the phase modulation element 7-2 may impart the distribution of phase modulation to the light flux for correcting fifth order spherical aberration.

Alternatively, the pattern of the transparent electrode of the phase modulation element 7-1 and the pattern of the transparent electrode of the phase modulation element 7-2 may differ from each other.

Figure 18:
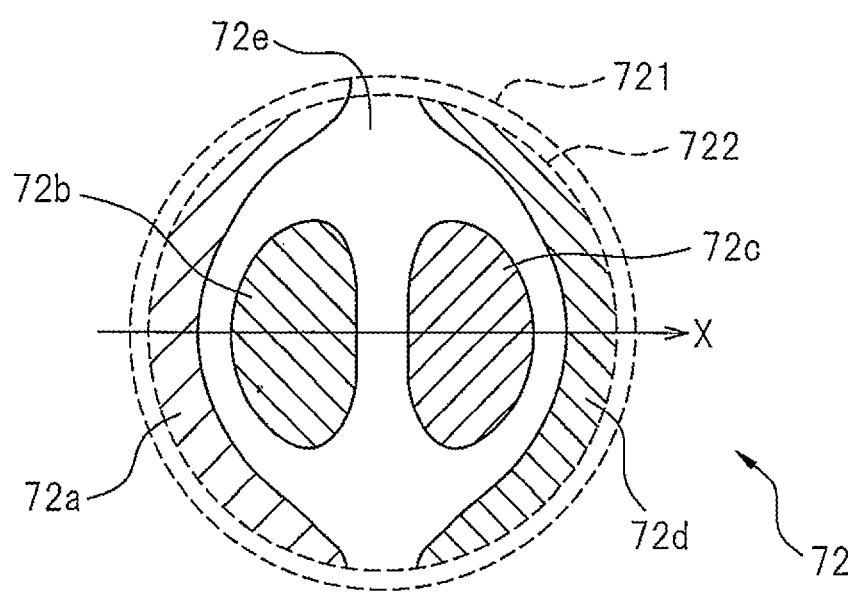
FIG. 18 is a schematic front view showing another example of the construction of one of the two transparent electrodes of a phase modulation element.

FIG. 18 is a schematic front view showing an example of the structure of one of two transparent electrode of the phase modulation element 7-2 according to this variant. Liquid crystal molecules contained in the liquid crystal layer of the phase modulation element 7-2 are aligned along a direction perpendicular to X-axis of FIG. 18. The other of the two transparent electrodes of the phase modulation element 7-2 is formed, for example, so as to cover the entire liquid crystal layer. Alternatively, both transparent electrodes may have the shape as shown in FIG. 18. In this variant, the phase modulation element 7-1 also may have, for example, the same construction as the phase modulation element 7 according to the second embodiment.

The transparent electrode 72 shown in FIG. 18 is optimized to impart distribution of phase modulation amount suitable for correcting coma aberration produced in the optical system of a laser microscope to the light flux passing through the phase modulation element 7-2. As shown in FIG. 18, in the inner region 722 at a prescribed distance (for example, 50 μm) inside of the effective diameter 721 of light flux incident on the phase modulation element 7-2, two electrodes 72a and 72b for advancing the phase and two electrodes 72c and 72d for retarding the phase are disposed. Further, reference electrode 72e for applying a reference electric voltage is disposed in the rest of the inner region 721 where the electrodes 72a to 72d are not disposed. Although not shown for the sake of simplicity, space is provided between electrodes which are thus insulated from each other.

When a positive (+) electric potential relative to the reference potential (for example, 0 V) applied to the reference electrode 72e is applied to the electrodes 72a and 72b, potential difference is produced relative to the opposing transparent electrode with the liquid crystal layer sandwiched therebetween, and alignment of the liquid crystal molecules contained therein changes in accordance with the potential difference. Thus, light beam passing this portion is subjected to action for advancing the phase. Also, when a negative (−) electric potential relative to the reference potential applied to the reference electrode 72e is applied to the electrodes 72c and 72d, potential difference is produced relative to the opposing transparent electrode with the liquid crystal layer sandwiched therebetween, and alignment of the liquid crystal molecules contained therein changes in accordance with the potential difference. Thus, a light beam passing this portion is operated for retarding the phase.

As a result, by appropriately adjusting the electric potential given to each of the electrodes, the phase modulation element 7-2 can impart a distribution of phase modulation amount suitable for cancelling the phase distribution of light flux corresponding to the coma aberration to the light flux obliquely incident on the objective lens 104 along X-axis in FIG. 18.

In still another variant, the light modulator element may have a phase modulation element with the electrode pattern shown in FIG. 18 and a phase modulation element with the electrode pattern obtained by rotating the electrode pattern shown in FIG. 18 by 90 degrees about the optical axis. In this way, the light modulator element can cancel coma aberration of light flux obliquely incident on the objective lens not only along X-axis direction in FIG. 18 but also along an arbitrary direction.

In each of the embodiments and variants described above, the polarizer plate may be attached removably to the light modulator element. For example, in the above described embodiments, by omitting the fall-off prevention member disposed at the open end of the guide rail of the rotation support member, the user can attach or remove the polarizer plate to and from the light modulator element. Space may be provided in the light irradiation apparatus for accommodating the polarizer plate so as to be able to hold the light modulator element after the light modulator element has been incorporated in the light irradiation apparatus. In this case, in order to prevent a user from inserting the polarizer plate incorrectly in the guide rail in wrong alignment of the transmission axis, a marker indicating the direction of the transmission axis may be provided on a portion of the polarizer plate.

The polarizer plate may be fixed on one end of the rotation support member such that light from the light source passes through the polarizer plate and then enters the phase reversal element or the phase modulation element. In this case, the polarizer plate is preferably a wire-grid-type polarizer plate of relatively high transmittance. The polarizer plate is disposed with the transmission axis of the polarizer in a direction in which the phase reversal element does not rotate the polarization plane of incident linear polarization light, i.e., in a direction parallel to the alignment direction of liquid crystal molecules of the phase reversal element.

As is evident from the above description, those skilled in the art can make various modifications to the embodiments without departing from the scope and spirit of the present invention.

LIST OF REFERENCE NUMERALS 100 laser microscope
101 laser light source
102 collimating optical system
103 light modulator element
104 objective lens
105 specimen
106 beam splitter
107 confocal optical system
108 confocal pinhole
109 detector
111 drive circuit
10, 11 light modulator element
2 phase reversal element
3 polarization plane rotation element
4 polarizer plate
41 projecting portion
42 stopper
5 rotation support member (rotation mechanism)
51 flange
52 guide rail
53 plate member
54 fall-off prevention member
6 casing (rotation mechanism)
61 groove
62 through-hole
63 fastening member
21, 22, 31, 32 transparent substrate
23, 24, 33, 34 transparent electrode
25, 26, 35, 36 Alignment film
27, 37 liquid crystal molecules
28, 38 sealing member
29, 39 frame
7, 7-1, 7-2 phase modulation element

What is claimed is:
1. A light modulator element comprising:
a first liquid crystal element which comprises a first liquid crystal layer containing liquid crystal molecules aligned along a first direction, and two first transparent electrodes disposed in opposition to each other with said first liquid crystal layer sandwiched therebetween, and which controls the phase of linear polarization light of a prescribed wavelength emitted from a light source and passing through said first liquid crystal layer by applying an electric voltage in accordance with said prescribed wavelength between said two first transparent electrodes;
a polarizer plate which is disposed between said light source and said first liquid crystal element and which comprises the transmission axis along said first direction or along a direction orthogonal to said first direction; and
a rotation mechanism which supports said first liquid crystal element and said polarizer plate and which rotates said first liquid crystal element and said polarizer plate integrally in one unit with an optical axis of said first liquid crystal element as the rotation axis.

2. The light modulator element according to claim 1, wherein said polarizer plate is supported removably to said rotation mechanism.

3. The light modulator element according to claim 1, wherein said rotation mechanism comprises a guide rail which is disposed between said light source and said first liquid crystal element and holds said polarizer plate along a surface perpendicular to said optical axis movably in a range from a first position where said polarizer plate does not interrupt light flux of said linear polarization light incident on said first liquid crystal element to a second position where the entire light flux passes through said polarizer plate.

4. The light modulator element according to claim 1, wherein one of said two first transparent electrodes of said first liquid crystal element is an annular electrode corresponding to at least one of first annular zones among a plurality of concentric annular zones with said optical axis as a center; and
wherein said first liquid crystal element reverses, by applying an electric voltage in accordance with said prescribed wavelength between said annular electrode and the other of said two first transparent electrodes, the phase of said linear polarization light passing through said first annular zone relative to the phase of said linear polarization light passing through second annular zone different from said first annular zone among said plurality of annular zones.

5. The light modulator element according to claim 4, further comprising a polarization plane rotation element which converts said linear polarization light exiting from said first liquid crystal element to radial polarization light;
wherein said rotation mechanism supports said first liquid crystal element, said polarization plane rotation element and said polarizer plate, and rotates said first liquid crystal element, said polarization plane rotation element and said polarizer plate integrally in one unit with said optical axis as the rotation axis.

6. The light modulator element according to claim 5, further comprising an attachment unit for attaching, in a microscope apparatus having said light source and an objective lens, said light modulator element between said light source and said objective lens, such that said light modulator element converts said linear polarization light emitted from said light source to radial polarization light, said radial polarization light being focused by said objective lens onto an object.

7. The light modulator element according to claim 5, wherein said polarization plane rotation element comprises a second liquid crystal layer containing liquid crystal molecules and two second transparent electrodes disposed in opposition to each other with the second liquid crystal layer sandwiched therebetween; and
wherein said second liquid crystal layer comprises a plurality of regions disposed along the circumferential direction with said optical axis as the center, alignment direction of said liquid crystal molecules contained in each of said plurality of regions being different from each other; and
wherein each of said plurality of regions of said second liquid crystal layer rotates, by applying an electric voltage in accordance with said prescribed wavelength between said two second transparent electrodes, the polarization plane of the component of said linear polarization light passing through a relevant region, in accordance with the alignment direction of said liquid crystal molecules contained in the relevant region, to become parallel to the radial direction with the optical axis as the center.

8. The light modulator element according to claim 1, wherein one of said two first transparent electrodes of said first liquid crystal element is a plurality of annular electrodes disposed in correspondence to each of the plurality of concentric annular zones with said optical axis as the center; and
wherein said first liquid crystal element controls, for each of said plurality of annular electrodes, by adjustment of electric voltage applied between the annular electrode and the other of said two first transparent electrodes, the amount of phase modulation of said linear polarization light passing through the annular zone for each of said plurality of annular zones.

9. The light modulator element according to claim 8, wherein said light modulation element is disposed in an optical system having said light source and an objective lens; and
wherein the light modulator element further comprises a drive apparatus for adjusting, for each of said plurality of annular electrodes, the electric voltage applied between the annular electrode and the other of said two first transparent electrodes so as to produce the phase modulation amount of said linear polarization light passing through each of said plurality of annular zones to thereby cancel the phase distribution of the wave front aberration produced in said optical system.

10. The light modulator element according to claim further comprising a second liquid crystal element which is disposed between said polarizer plate and said first liquid crystal element along said optical axis, and which comprises a second liquid crystal layer containing liquid crystal molecules aligned along said first direction, and two second transparent electrodes disposed in opposition to each other with said second liquid crystal layer sandwiched therebetween and which controls, by applying electric voltage in accordance with said prescribed wavelength between said two second transparent electrodes, the phase of said linear polarization light passing through said second liquid crystal layer;
wherein said rotation mechanism supports said first liquid crystal element, said second liquid crystal element and said polarizer plate, and rotates said first liquid crystal element, said second liquid crystal element and said polarizer plate integrally in one unit with the optical axis of said first liquid crystal element as the rotation axis.

11. The light modulator element according to claim 8, wherein the electrode pattern of at least one of said two second transparent electrodes is different from either electrode pattern of said two first transparent electrodes.

12. A microscope apparatus comprising:
a light source which emits linear polarization light with a prescribed wavelength;
a light modulator element which controls the phase of said linear polarization light;
an objective lens which focuses the light flux passing through said light modulator element onto a prescribed spot of a specimen; and
a light receiving element which receives light from said prescribed spot;
wherein said light modulator element comprises:
a first liquid crystal element which comprises a first liquid crystal layer containing liquid crystal molecules aligned along a first direction, and two first transparent electrodes disposed in opposition to each other with said first liquid crystal layer sandwiched therebetween, and which controls the phase of said linear polarization light passing through said first liquid crystal layer by applying an electric voltage in accordance with said prescribed wavelength between said two first transparent electrodes;

a polarizer plate which is disposed between said light source and said first liquid crystal element and which comprises the transmission axis along said first direction or along a direction orthogonal to said first direction; and a rotation mechanism which supports said first liquid crystal element and said polarizer plate and which rotates said first liquid crystal element and said polarizer plate integrally in one unit with an optical axis of said first liquid crystal element as the rotation axis.

* * * * *